July 9, 1940.  H. A. THOMPSON  2,207,079
MULTIPLE CONTROL APPARATUS
Filed Dec. 23, 1929   7 Sheets-Sheet 1

INVENTOR:
H. A. Thompson,
by A. L. Vencill,
His Attorney

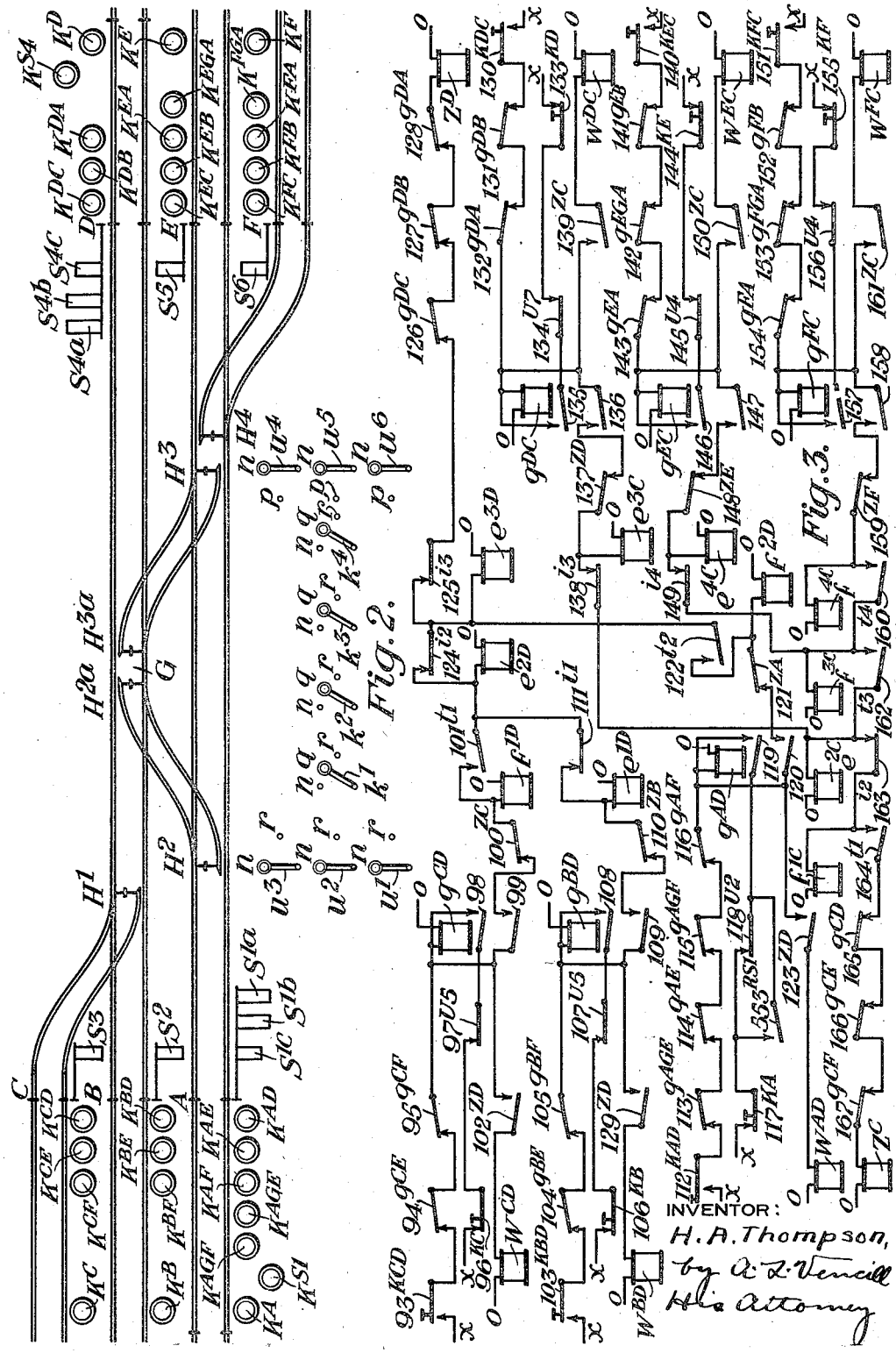

July 9, 1940.  H. A. THOMPSON  2,207,079
MULTIPLE CONTROL APPARATUS
Filed Dec. 23, 1929   7 Sheets-Sheet 5

INVENTOR:
H. A. Thompson,
by A. R. Vincill
His Attorney

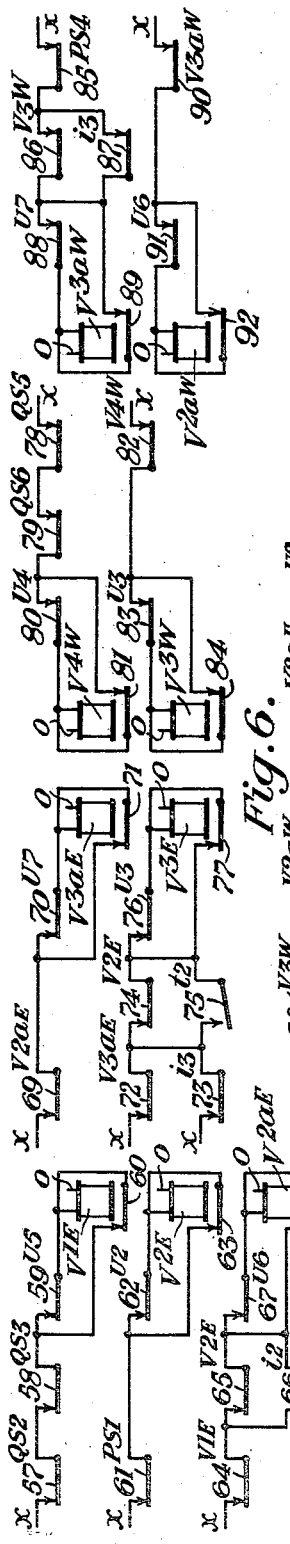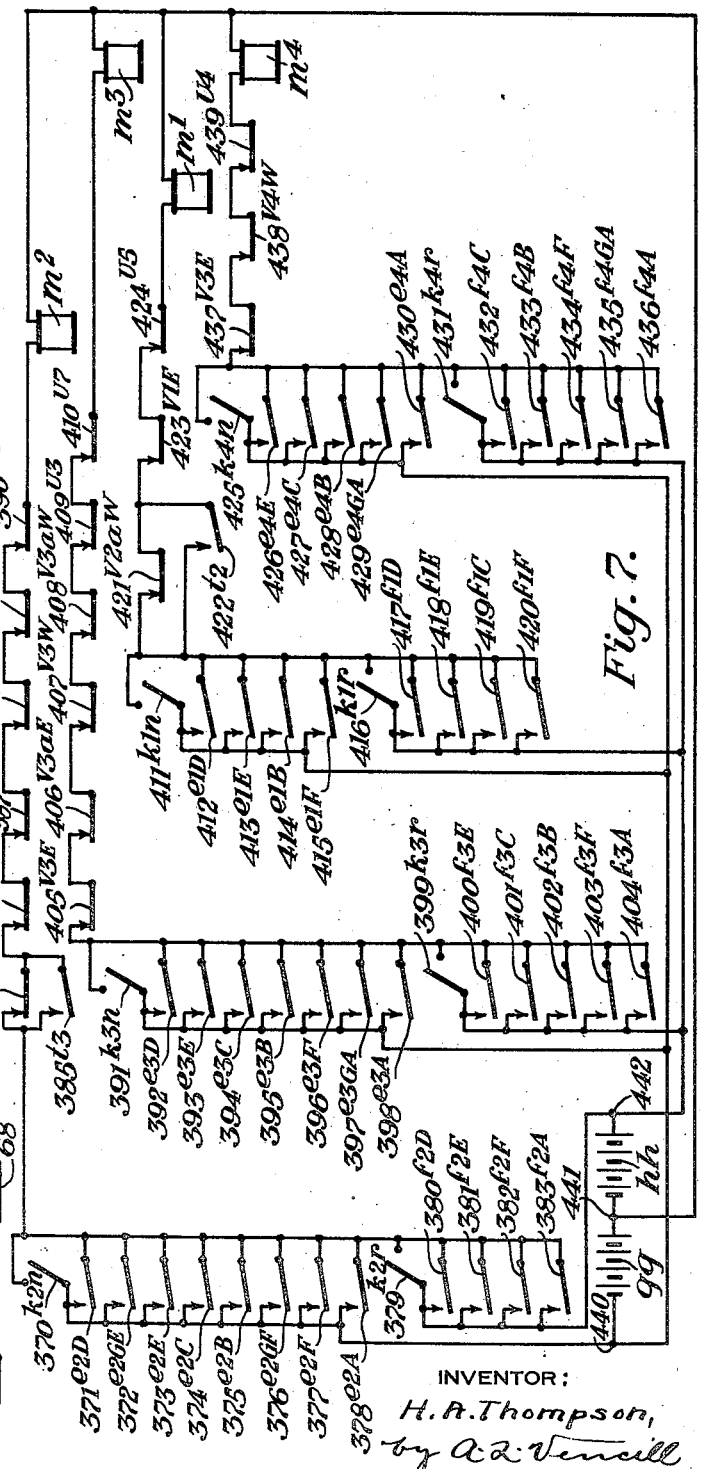
Fig. 6.
Fig. 7.

July 9, 1940.    H. A. THOMPSON    2,207,079
MULTIPLE CONTROL APPARATUS
Filed Dec. 23, 1929    7 Sheets-Sheet 7
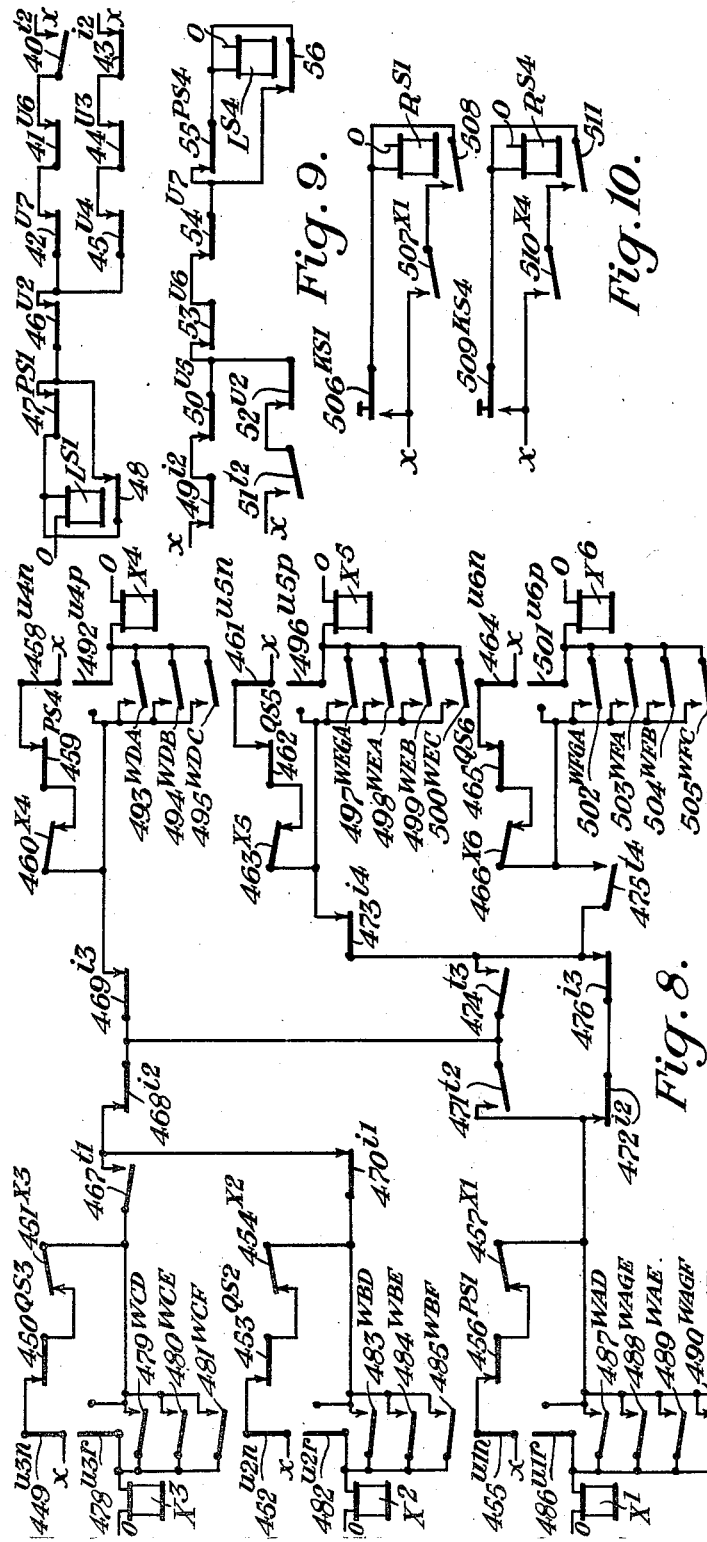
Fig. 8.
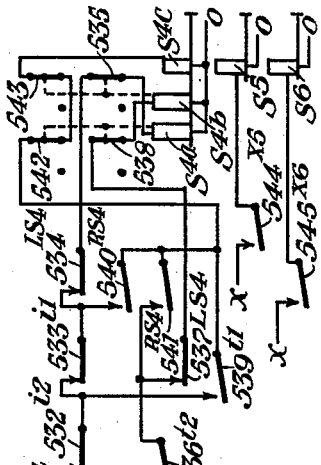
Fig. 9.
Fig. 10.
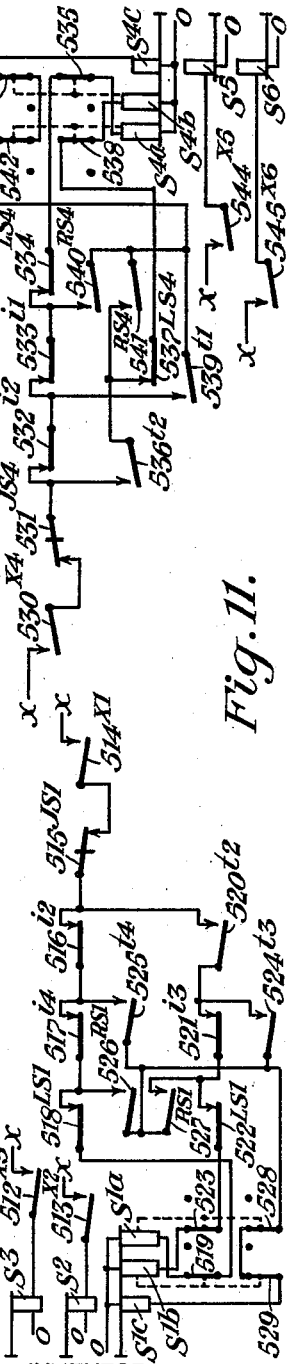
Fig. 11.
INVENTOR:
H. A. Thompson,
by A. R. Vencell
His Attorney Patented July 9, 1940

2,207,079

UNITED STATES PATENT OFFICE 2,207,079

MULTIPLE CONTROL APPARATUS

Howard A. Thompson, Edgewood Borough, Pa., assignor to The Union Switch & Signal Company, Swissvale, Pa., a corporation of Pennsylvania Application December 23, 1929, Serial No. 416,061

78 Claims. (Cl. 246—134)

My invention relates to multiple control apparatus, and is particularly adapted for, though not limited to, the control of railway track switches and signals in a railway switching or interlocking layout.

One feature of my invention is the provision of means for controlling successively the devices in each of various partly inter-inclusive groups of devices by only one manually operable means. Another feature of my invention is the provision of interlocking control without the use of mechanically interlocked levers.

I will describe one form of apparatus embodying my invention, and will then point out the novel features thereof in claims.

The accompanying drawings, Figs. 1 to 11 inclusive, are diagrammatic views showing the constituent parts of one form of apparatus embodying my invention.

Figure 1A:
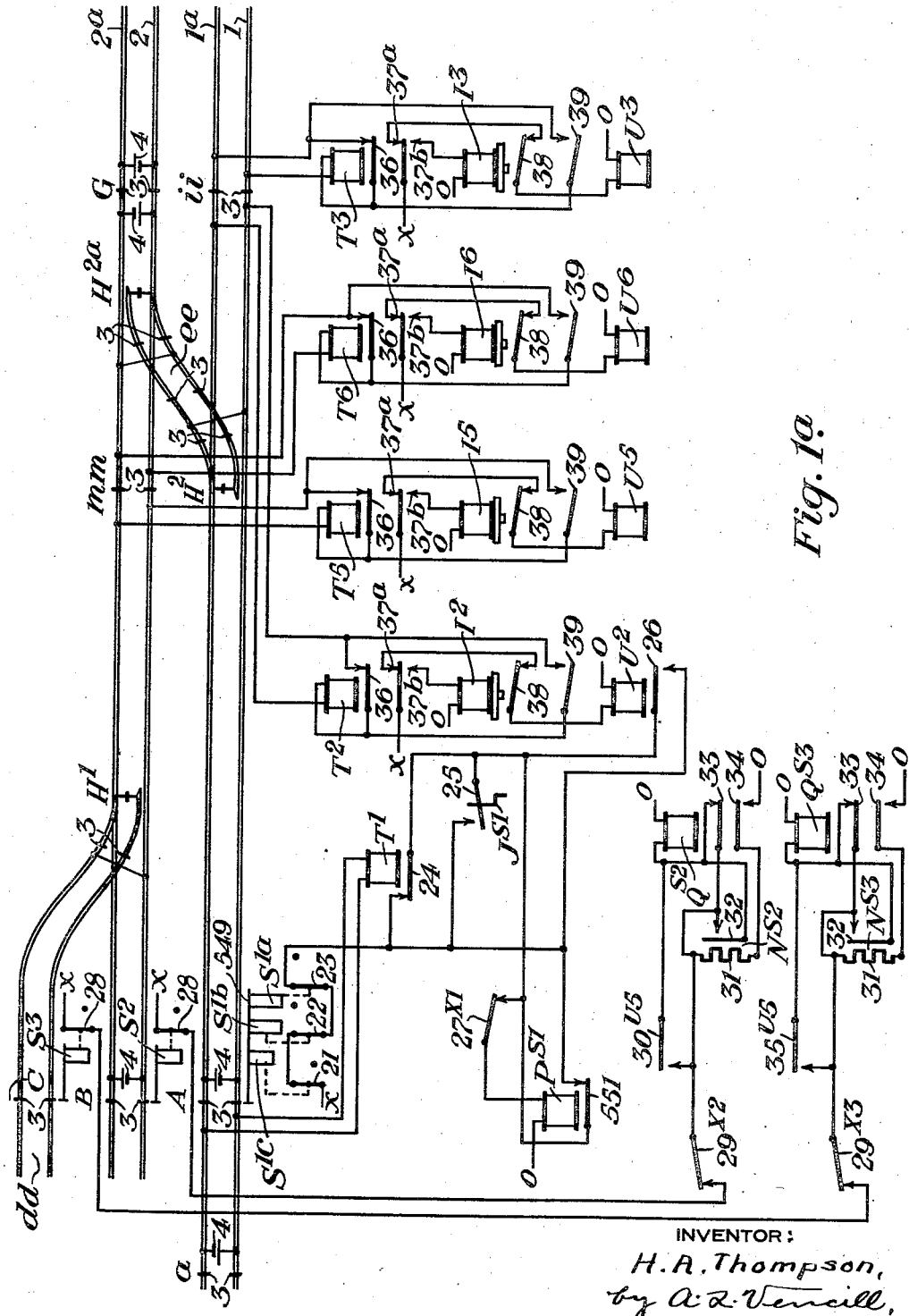
Figure 1B:
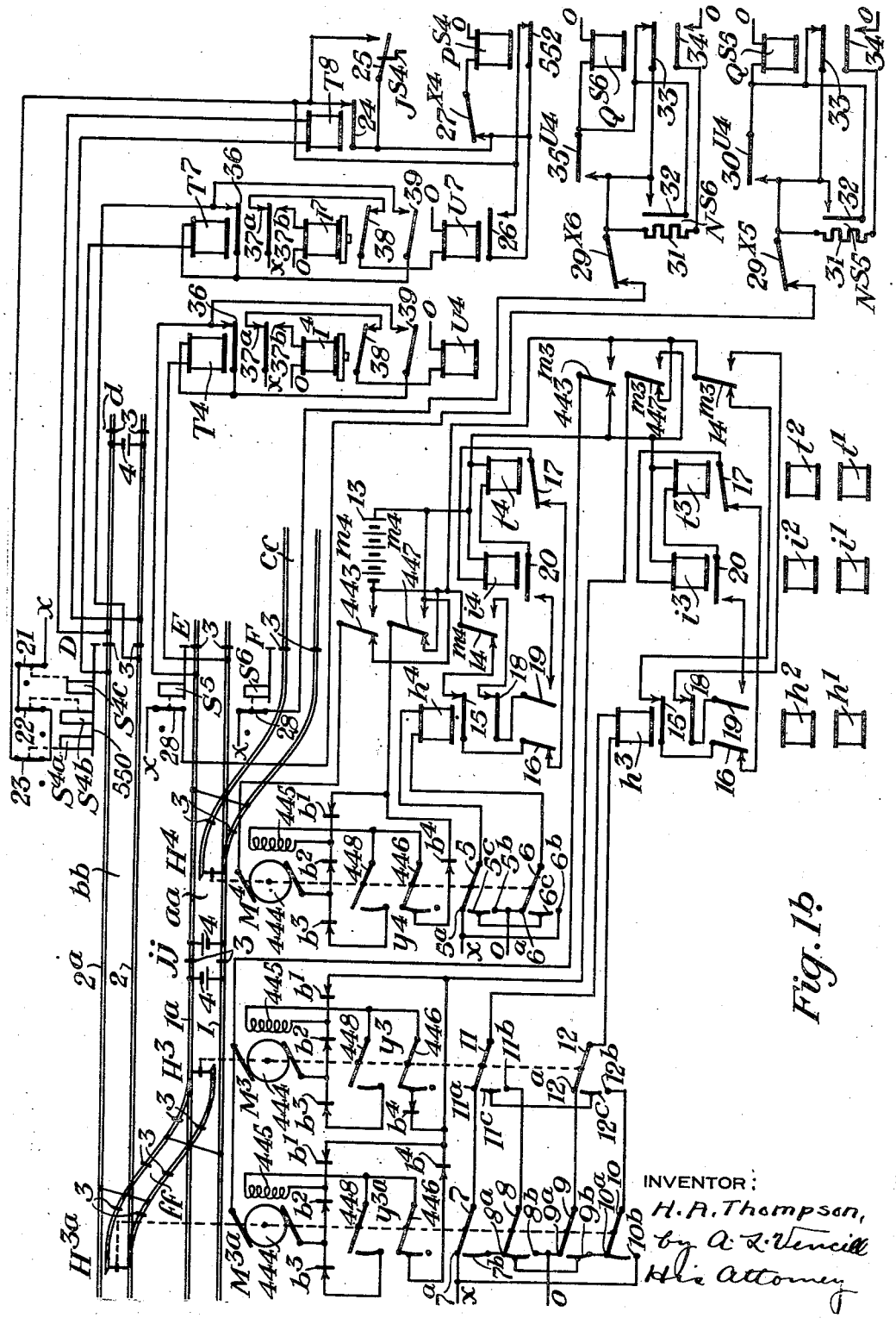

Referring first to Figs. 1a and 1b, these drawings, when placed end to end, with Fig. 1a on the left, show a stretch of double track railway, tracks $aa$ and $bb$ of which are interconnected through a crossover $ee$ with which they are respectively joined by switches $H^2$ and $H^{2a}$, and are likewise interconnected by a second crossover $ff$ with which they are respectively joined by switches $H^3$ and $H^{3a}$. Tracks $aa$ and $bb$ are also respectively joined to passing sidings $cc$ and $dd$ by switches $H^4$ and $H^1$. The reference characters $1$ and $1^a$ designate the rails of track $aa$, and reference characters $2$ and $2^a$ designate the rails of track $bb$.

These rails are divided by insulated joints $3$ to form a plurality of track sections, $a$—A, A—$ii$, $ii$—$jj$, $jj$—E, B—$mm$, $mm$—G, G—D and D—$d$. Each of these track sections is supplied with current by a battery $4$ connected across the rails adjacent one end of the section. A track relay designated by the reference character T, with a distinguishing exponent, is connected across the rails adjacent the opposite end of each track section.

Reference character S, with a distinguishing exponent, designates a signal which is placed adjacent the points A, B, C, D, E and F, respectively, and which, as here shown, is of the semaphore type. Signals $S^{1a}$, $S^{1b}$ and $S^{1c}$ are mounted on a common mast $549$, and signals $S^{4a}$, $S^{4b}$ and $S^{4c}$ are mounted on a common mast $550$. Signals $S^{1a}$, $S^{1b}$, $S^{1c}$, $S^2$ and $S^3$ govern eastbound traffic moves, that is, moves which are made over the stretch of track from left to right as shown in the drawings, and signals $S^{4a}$, $S^{4b}$, $S^{4c}$, $S^5$ and $S^6$ govern westbound traffic moves, that is, moves which are made over the stretch of track from right to left as shown in the drawings.

Between the group of eastbound signals and the group of westbound signals, eleven different routes may be established according to the positions of the various switches. Over each of these routes, traffic can proceed in either direction, that is, from west to east, or from east to west, as controlled by a signal for each direction of traffic of each route, respectively.

The arrangements of the switches for these various routes are as given in the following table:

Route #1—A to E, switches $H^2$, $H^3$, and $H^4$ normal.

Route #2—A to F, switches $H^2$ and $H^3$ normal, and $H^4$ reversed.

Route #3—A to D, switches $H^2$ and $H^{2a}$ reversed, and $H^{3a}$ normal.

Route #4—A to E, switches $H^2$, $H^{2a}$, $H^{3a}$ and $H^3$ reversed and $H^4$ normal.

Route #5—A to F, switches $H^2$, $H^{2a}$, $H^{3a}$, $H^3$ and $H^4$ reversed.

Route #6—B to D, switches $H^1$, $H^{2a}$, and $H^{3a}$ normal.

Route #7—B to E, switches $H^1$, $H^{2a}$, and $H^4$ normal, and $H^{3a}$ and $H^3$ reversed.

Route #8—B to F, switches $H^1$ and $H^{2a}$ normal, and $H^{3a}$, $H^3$ and $H^4$ reversed.

Route #9—C to D, switch $H^1$ reversed, and switches $H^{2a}$ and $H^{3a}$ normal.

Route #10—C to E, switches $H^1$, $H^{3a}$ and $H^3$ reversed, and $H^{2a}$ and $H^4$ normal.

Route #11—C to F, switches $H^1$, $H^{3a}$, $H^3$ and $H^4$ reversed, and $H^{2a}$ normal.

Each track section in which a switch is located will be referred to hereinafter as a detector section. Track sections $a$—A and D—$d$ in the rear of signals $S^1$ and $S^4$, respectively, will be referred to as approach track sections.

Each switch H is operated by a motor designated by the reference character M with an exponent corresponding with that of the reference character H for the switch. Each motor M comprises an armature $444$ and a field winding $445$. The motors $M^3$ and $M^{3a}$ for operating switches $H^3$ and $H^{3a}$ rsepectively, of crossover $ff$ are controlled in multiple by pole-changing contacts of a polarized relay $m^3$, the control for which is shown in Fig. 7. The control of the motors for operating switches $H^2$ and $H^{2a}$ of crossover $ee$ is similar to that for motors $M^3$ and $M^{3a}$, and is therefore not shown in the drawings. Motor $M^4$ for operating switch $H^4$ is controlled by pole-changing contacts of a polarized relay $m^4$. The control for the motor of switch H¹ is similar to that for motor M⁴, and is therefore omitted from the drawings.

Included in the control circuits for each motor M are four asymmetric units $b^1$, $b^2$, $b^3$ and $b^4$. Each of these units is so constructed that it will permit the flow in only one direction of sufficient current to operate the motor; for example, unit $b^4$, in the circuit for motor M⁴, permits current of sufficient magnitude to operate motor M⁴ to flow away from contact 446 of circuit controller $y^4$ but not toward contact 446. Each of the units $b$ may be similar to those disclosed and claimed in Letters Patent of the United States, No. 1,640,335, granted to L. O. Grondahl August 23, 1927.

Operated in conjunction with each switch is a circuit controller designated by the reference character $y$ with an exponent corresponding with that of the reference character H for the switch. Contacts 448 operated by these circuit controllers and included in the control circuits for switch motors M are closed at all times except while the respective switches are in their normal position. Contacts 446 also operated by these circuit controllers, and which are also included in the control circuits for switch motors M, are closed at all times except while the respective switches are in the reverse position.

The circuit controller $y^4$ for switch H⁴ is provided with pole-changing contact arms 5 and 6 for so controlling a polarized switch indication relay $h^4$ that the contacts of this relay will be closed in the normal direction while switch H⁴ is in its normal position, and will be closed in the reverse direction while switch H⁴ is reversed. The control of relay $h^1$ by a similar circuit controller $y^1$ for switch H¹ is similar to that of relay $h^4$, and is therefore not shown in the drawings. Switch circuit controller $y^3$ is provided with contact arms 11 and 12, and circuit controller $y^{3a}$ is provided with contact arms 7, 8, 9 and 10 which are so associated in the control of the polarized switch indication relay $h^3$ as to cause the polar contacts of relay $h^3$ to be closed in the normal direction while switches H³ and H³ᵃ are in the normal position, and to cause the polar contacts of relay $h^3$ to be closed in the reverse direction while switches H³ and H³ᵃ are reversed. The control of polarized switch indication relay $h^2$ by switches H² and H²ᵃ is similar to that of relay $h^3$ by switches H³ and H³ᵃ, and is therefore not shown in the drawings.

For each switch indication relay $h$ there is a reverse indication relay designated by the reference character $t$, and a normal indication relay designated by the reference character $i$, each being provided with an exponent corresponding to that of the associated relay $h$. Each normal indication relay $i$ is controlled by normal contacts of the control relay $m$ and the relay $h$ for the same switch or pair of switches. Each reverse indication relay $t$ is controlled by reverse contacts of the control relay $m$ and the indication relay $h$ for the same switch or pair of switches.

Each of the signals shown in the drawings operates a circuit controller having contacts which are closed when and only when their signal is indicating "stop." Such contacts are shown adjacent the signal diagrams in Figs. 1ᵃ and 1ᵇ, and are designated by the reference numbers 21, 22, 23 and 28, respectively. Similar contacts are shown adjacent the diagrams for signals S¹ and S⁴ in Fig. 11.

Contacts 23, 22 and 21, shown in Fig. 1ᵃ adjacent the diagrams for signals S¹, are operated by signals S¹ᵃ, S¹ᵇ and S¹ᶜ, respectively, and are included in the control circuit for an approach locking relay designated by the reference character P^S¹. Similar contacts 23, 22 and 21, shown adjacent the diagrams for signals S⁴ in Fig. 1ᵇ, are operated by signals S⁴ᵃ, S⁴ᵇ and S⁴ᶜ, respectively, and are included in the control circuit for a second approach locking relay designated by the reference character P^S⁴. A similar contact 28, operated by each of the signals S², S³, S⁵ and S⁶, respectively, is included in the control circuits for stick locking relays Q^S², Q^S³, Q^S⁵ and Q^S⁶, respectively.

Approach locking relay P^S¹ becomes de-energized when a control relay X¹, the operating circuit for which is shown in Fig. 8, for signals S¹ becomes energized, or when the arm of any of these signals leaves its "stop" position. Relay P^S⁴ is similarly controlled by control relay X⁴ for signals S⁴ and by signals S⁴. Each of these approach locking relays is also so controlled that, while a respective approach track relay is de-energized, the approach locking relay can again become energized only through a back contact of a repeater relay for an adjacent detector track section, or through a time releasing device contact which will become closed only upon the lapse of a measured interval of time after the beginning of the operation of the releasing device. These releasing devices may be of the well-known clockwork type, and are designated by the reference letter J with distinguishing exponents.

Stick locking relay Q^S² becomes de-energized when control relay X² for signal S² becomes energized, or when the arm of signal S² leaves its "stop" position. Relay Q^S² can then again become energized only upon the de-energization of detector track section repeater relay U⁵, or upon the closing of contact 32 of a time relay N^S² when signal S² is indicating "stop" and its control relay X² is de-energized. As here shown, time relay N^S² is of the thermal type comprising a heater winding 31, which, upon the lapse of a period of time after it has become energized, causes its contact 32 to close. Relays Q^S³, Q^S⁵ and Q^S⁶ are controlled similarly to relay Q^S².

Approach and stick locking relays P and Q, when de-energized, prevent the operation of each switch in the routes governed by the signals associated in the control of these relays, thus enforcing after a signal has been returned to its stop position, the lapse of a measured time interval before the switches in the route governed by the signal can again be operated.

Each of the detector track section relays T² to T⁷, inclusive, when de-energized, controls a slow-releasing relay designated by the reference letter I with an exponent corresponding to that of the track relay by which it is controlled. Each of these track relays, together with its associated slow-releasing relay I, controls a repeater relay designated by the reference letter U with an exponent corresponding to that of the track relay by which it is controlled. Each of the track relays T² to T⁷, inclusive, is provided with a stick circuit, and has a pick-up circuit controlled by a front contact of its associated slow-releasing relay I. The purpose of this control of relays T² to T⁷ is to check the operation of the associated slow-releasing relay I each time one of these track relays becomes de-energized.

In each of the drawings, the contacts operated by the various relays or by the time releases J or by other control devices which will be hereinafter described are identified by numbers, such numbers having distinguishing exponents when such contacts are not shown adjacent the respective relay or release or other device by which they are operated. The exponent for each of these contact numbers comprises the reference character and exponent for the respective relay, release, or other device, for example, the exponent $U^5$ for contact $30^{U5}$, shown in the circuit for relay $Q^{S2}$ in Fig. 1a, comprises the reference character U and its exponent 5 for repeater relay $U^5$ which operates contact $30^{U5}$. Similarly, exponent $m^4$ for contact $443^{m4}$, in the operating circuit for motor $M^4$, comprises reference character $m$ and its exponent 4 for a switch control relay $m^4$ which operates contact $443^{m4}$.

In Fig. 2 is shown a combined track diagram and operating board on which manually operable devices designated by the reference character K with distinguishing exponents are disposed according to the routes which they control. As here indicated, devices K are of the push button type which continue in the depressed position only while being manually held in such position.

To arrange for a traffic movement by a given route as, for example, route 9 in the direction from D to C, the operator depresses a route push button $K^{DC}$ adjacent the diagram for signals $S^4$. This operation of push button $K^{DC}$ closes contact $130^{KDC}$ in the pick-up circuit for a route stick relay $g^{DC}$ shown in Fig. 3. Relay $g^{DC}$ upon becoming energized completes its own stick circuit through contact $133^{KD}$. Relay $g^{DC}$ then continues energized through this stick circuit after the operator ceases to depress push button $K^{DC}$. Relay $g^{DC}$ upon becoming energized causes a normal switch control relay $e^{3C}$ to become energized. Relay $e^{3C}$ then causes switches $H^3$ and $H^{3a}$ to be operated to the normal position if these switches are not already in the normal position, and if the arrangement of a conflicting route has not already been started. When switches $H^3$ and $H^{3a}$ have been operated to the normal position, normal indication relay $i^3$ becomes energized, causing a normal switch control relay $e^{2C}$ to become energized. Relay $e^{2C}$ upon becoming energized causes switches $H^2$ and $H^{2a}$ to be operated to the normal position if they are not already in that position. When switches $H^2$ and $H^{2a}$ are in the normal position, normal indication relay $i^2$ is energized, causing a reverse switch control relay $f^{1C}$ to become energized. Relay $f^{1C}$ upon becoming energized causes switch $H^1$ to be operated to its reverse position. When switch $H^1$ occupies its reverse position, reverse indication relay $t^1$ becomes energized.

With the switches arranged in the route from D to C, a "route-complete" relay $Z^C$ becomes energized, causing a signal relay $W^{DC}$ to become energized. Relay $W^{DC}$ upon becoming energized causes a second signal relay $X^4$ shown in Fig. 8 to become energized. The arm of signal $S^{4c}$ then moves to the "proceed" position.

When the operator afterward desires to arrange a route which conflicts with the route from D to C, or when he desires to simply return the arm of signal $S^{4c}$ to its stop position, he depresses a restoring push button $K^D$ thereby opening contact $133^{KD}$ in the stick circuit for relay $g^{DC}$ and so causing the de-energization of all the relays previously energized when push button $K^{DC}$ was depressed. The arranging of any other route can then be accomplished by the operation of its route push button. When the operator afterward desires to arrange a route which conflicts with the route so arranged, he depresses the restoring push button shown in Fig. 2 adjacent the beginning point of the route so arranged.

Push buttons $K^{S1}$ and $K^{S4}$ effect the call-on control for signals $S^{1c}$ and $S^{4c}$, respectively.

Auxiliary switch control devices, shown in the lower part of Fig. 2 as levers $k$, may be used as desired to control each switch separately instead of with any given route. Each of the levers $k$ has three positions designated $n$, $q$, and $r$, respectively. These levers stand normally in the $q$ position, in which they have no effect upon the control of the switches.

Each lever $k$, when moved to its $n$ position, closes a contact which is designated by a reference character having an exponent comprising the letter $n$ and the reference character and exponent for the lever. For example, contact $370^{k2n}$ in the circuit for relay $m^2$ is closed by lever $k^2$ when this lever is moved to its $n$ position. Similarly, contact $379^{k2r}$ in the circuit for relay $m^2$ is closed by lever $k^2$ when this lever is moved to its $r$ position. Each lever $k$, when moved to its $n$ position, causes the corresponding switch or switches to be operated to the normal position, which is as shown in the drawings. Each lever $k$ when operated to its $r$ position controls the operation of the corresponding switch or switches to the reverse position.

Auxiliary signal control devices, shown in the lower part of Fig. 2 as levers $u$, may also be used instead of the route push buttons K to control each signal. Each of the levers $u$ for controlling eastbound signals has a normal position $n$ and a reverse position $r$, and each of the levers $u$ for controlling westbound signals has a normal position $n$ and a reverse position $p$. Each of these levers $u$ when operated to its $r$ or its $p$ position, completes the control circuit for the corresponding signal, and when in its $n$ position, permits the operation of an opposing signal.

Figure 4:
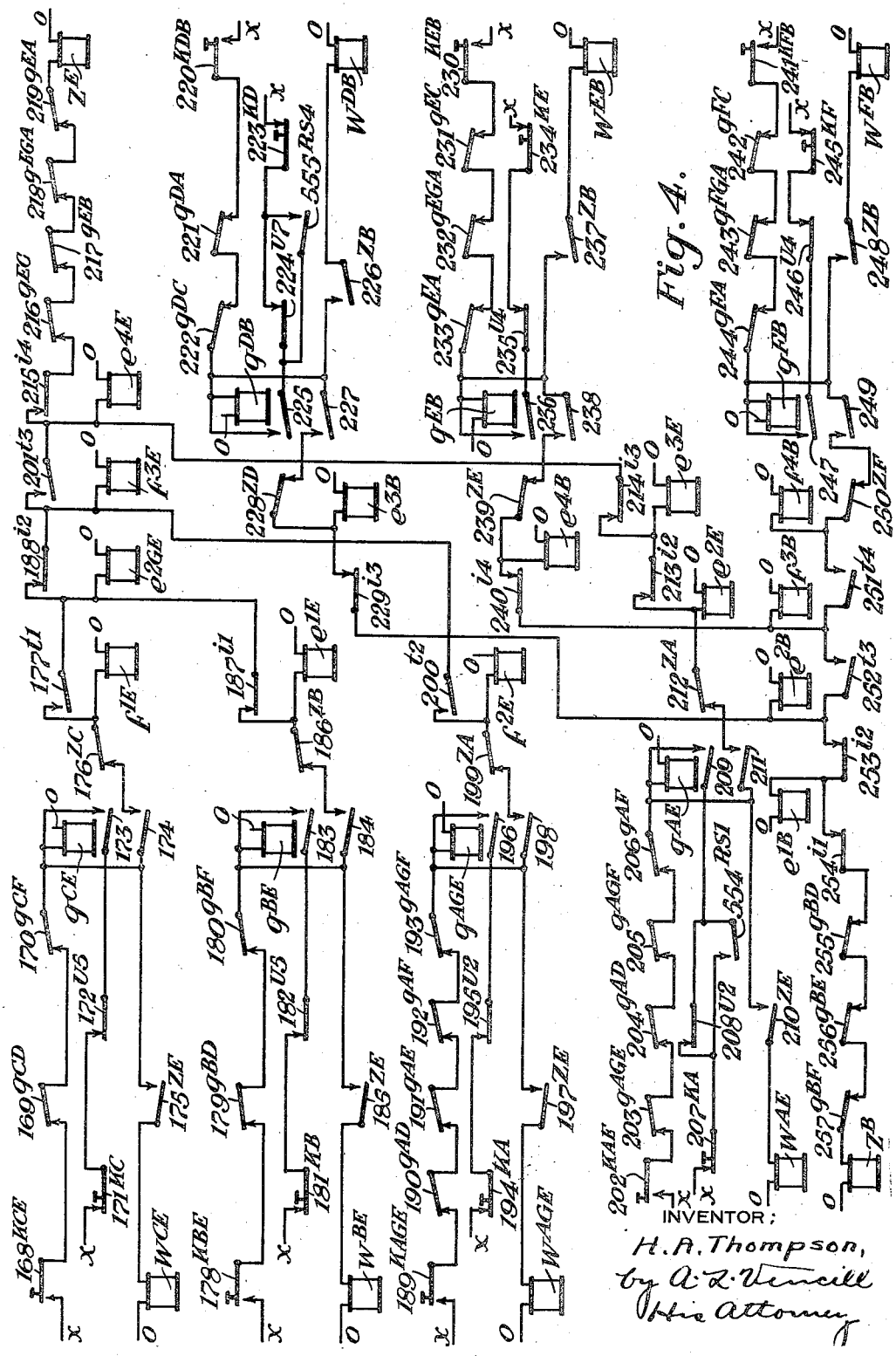
Figure 5:
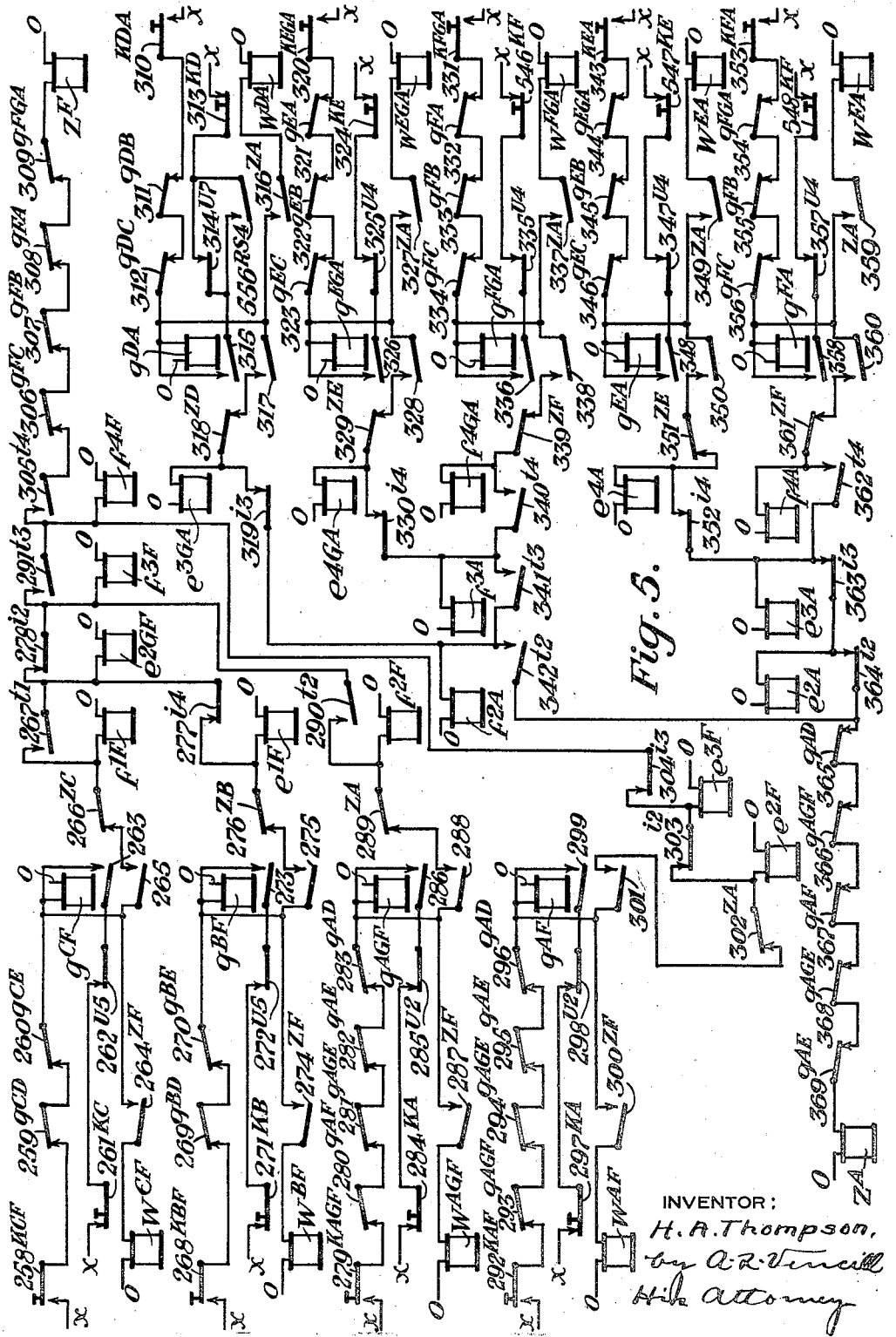

In Figs. 3, 4, and 5 are shown the control circuits for all route stick relays each of which is designated by the letter $g$ with an exponent which indicates the route and traffic direction controlled by such relay $g$. In Figs. 3, 4, and 5 are also shown all normal and reverse switch control relays each of which is designated by the letter $e$ or $f$, respectively, with an exponent comprising the number of its switch and a letter corresponding with the exponent for the associated route-complete relay. The exponents for some of the relays $e$ and $f$, those for switches of routes which include switches $H^2$ and $H^3$ reversed, also comprise the letter G. In Figs. 3, 4, and 5 are also shown all route-complete relays each of which is designated by the letter Z with an exponent comprising the letter which indicates the end of all routes by which the route-complete relay is controlled. Also shown here are first signal control relays each of which is designated by the letter W with an exponent to indicate the route and traffic direction controlled by the associated signal.

Referring to Fig. 6, route locking relays, each of which is designated by the reference letter V with a distinguishing exponent including the letter E, are controlled to prevent operation of the switches in each route when an approach or stick locking relay P or Q, respectively, for the eastbound direction of the route is de-energized. Route locking relays, each of which is designated by the letter V with an exponent including the letter W, are similarly controlled to prevent operation of the switches in each route when an approach or stick locking relay P or Q, respectively, for the westbound direction of the route is de-energized.

In Fig. 7 are shown the circuits for polarized switch control relays m controlled by normal and reverse switch control relays e and f, respectively, or by auxiliary switch control levers k. Control of relays m by either normal or reverse control relays e or f, respectively, or by levers k is prevented when certain track repeater relays U or certain route locking relays V are de-energized.

Referring now to Fig. 8, the circuits for second signal control relays, each of which is designated by the letter X with an exponent corresponding to the number of the signal which it governs, are controlled by the first signal control relays W or by auxiliary signal levers u. Each relay X is also controlled by normal and reverse switch indication relays i and t, respectively, to insure that all switches in the associated route are in the proper position before the relay X for that route can be energized. Each relay X is also controlled by a normal contact of the auxiliary signal control lever u for the opposite direction of traffic, and by the approach or stick locking relay P or Q, and the second signal control relay X for an opposing signal of the same route.

Signal stick relays are shown in Fig. 9. Each of these is designated by the letter L with an exponent to indicate the signals with which it is associated. Each of these stick relays is controlled by the approach locking relay P which is associated with the same signals, as well as by repeater relays U for all track sections over which the signals govern.

Fig. 10 shows the control circuits for signal call-on relays each of which is designated by the reference letter R with an exponent to indicate the signals with which it is associated. Each of these call-on relays is provided with a pick-up circuit which is controlled by its call-on push button K, and is provided with a stick circuit which is controlled by the second signal control relay for the same signals.

In Fig. 11 are shown the circuits for the various signals controlled by their second signal control relays X. Some of the signals are also controlled by normal and reverse switch indication relays for the switches in the routes governed by these signals, and by time releases J, and signal stick relays L.

Having thus described in general the arrangement and location of the various parts comprising my invention, I will now proceed to explain the operation of the apparatus.

As shown in the drawings, all parts are in the normal condition, that is, each track section is clear; each push button K and each auxiliary control lever k and u is in its normal position; the polar contacts of each polarized switch control relay m are in their normal position; each track switch is in its normal position; and each signal is indicating "stop."

Because switch $H^4$ is in its normal position, contact arms 5 and 6 of circuit controller $y^4$ connect with terminals $5^a$ and $6^a$, respectively, causing current to be supplied to polarized indication relay $h^4$ in the normal direction, and the contacts of relay $h^4$ are therefore closed in their normal position. With relay $h^4$ energized in the normal direction and with the polar contacts of relay $m^4$ closed in their normal position, normal indication relay $i^4$ is energized by a circuit which passes from a source of current, here shown as a battery 13, through contact $14^{m4}$, contacts 15 and 16 of relay $h^4$, contact 17 of relay $t^4$ and the winding of relay $i^4$ back to battery 13.

On account of switches $H^3$ and $H^{3a}$ being in their normal positions, polarized indication relay $h^3$ is energized in the normal direction by its circuit passing from terminal x of a current source which is not shown in the drawings, through contact $7^a$—7 of circuit controller $y^{3a}$, contact $11^a$—11 of circuit controller $y^3$, winding of relay $h^3$, contact $12$—$12^a$ of circuit controller $y^3$ and contact 9—$9^a$ of circuit controller $y^{3a}$ to terminal o of the same current source. On account of relay $h^3$ being energized in the normal direction and on account of the polar contacts of relay $m^3$ being closed in the normal position, normal indication relay $i^3$ is energized by its circuit passing from battery 13, through contact $14^{m3}$, contacts 15 and 16 of relay $h^3$, contact 17 of relay $t^3$, and winding of relay $i^3$ back to battery 13.

Polarized indication relays $h^1$ and $h^2$ are energized in the normal direction by circuits which are similar to those just traced for relays $h^4$ and $h^3$, respectively. Normal indication relays $i^1$ and $i^2$ are energized by circuits which are similar to those traced for relays $i^3$ and $i^4$.

With signals $S^1$ indicating "stop", approach locking relay $P^{S1}$ is energized by its circuit passing from terminal x, through contacts 21, 22 and 23 operated by signals $S^{1c}$, $S^{1b}$ and $S^{1a}$, respectively, contact 24 of relay $T^1$ in multiple with contact $55^l$ of relay $P^{S1}$, contact $27^{X1}$, and the winding of relay $P^{S1}$ to terminal o. Approach locking relay $P^{S4}$ is energized by a circuit which is similar to that just traced for relay $P^{S1}$.

With signal $S^2$ indicating "stop", stick locking relay $Q^{S2}$ is energized by its stick circuit passing from terminal x, through contact 28 of signal $S^2$, contact $29^{X2}$, contact 33 of relay $Q^{S2}$, and winding of relay $Q^{S2}$ to terminal o. Stick locking relays $Q^{S3}$, $Q^{S5}$ and $Q^{S6}$ are energized by circuits which are similar to the circuit just traced for relay $Q^{S2}$.

Conditions being normal, each of the track relays $T^2$ to $T^7$, inclusive, is energized by its stick circuit through its contact 36. Relay $T^2$ being energized, repeater relay $U^2$ is energized by its circuit passing from terminal x, through contact $37^a$ of relay $T^2$, contact 38 of relay $I^2$, and the winding of relay $U^2$ to terminal o. Repeater relays $U^3$ to $U^7$, inclusive, are also energized by circuits which are controlled similarly to relay $U^2$ by track relays $T^3$ to $T^7$, respectively.

With all approach and stick locking relays P and Q, respectively, energized, and with all track repeater relays U energized, all of the route locking relays $V^E$ and $V^W$ are energized as shown in Fig. 6. For example, relay $V^{1E}$ is energized by its pick-up circuit passing from terminal x, through contacts $57^{QS2}$, $58^{QS5}$, $59^{U5}$, and the winding of relay $V^{1E}$ to terminal o. Relay $V^{1E}$ is also energized by its stick circuit which is the same as its pick-up circuit just traced except including contact 60 of relay $V^{1E}$ instead of contact $59^{U5}$.

Each of the signal stick relays $L^{S1}$ and $L^{S4}$ is energized, both a pick-up and a stick circuit for each of these relays being closed. The pick-up circuit for relay $L^{S1}$ is closed because certain track relays are energized and because switches $H^2$ and $H^{2a}$ are in their normal position. The pick-up circuit for relay $L^{S1}$ passes from terminal x, through contacts $43^{12}$, $44^{U3}$, $45^{U4}$, $46^{U2}$, $47^{PS1}$, and the winding of relay $L^{S1}$ to terminal o. A stick circuit for relay $L^{S1}$ is the same as the pick-up circuit just traced except including contact 48 of relay $L^{S1}$ instead of contact $47^{PS1}$. The pick-up and stick circuits for relay $L^{S4}$ are similar, respectively, to those just traced for relay $L^{S1}$, and will therefore be readily understood by reference to the drawings.

I will now assume that the operator desires to arrange for a traffic movement over route 1, from A to E. He therefore depresses push button $K^{AE}$, closing contact $202^{KAE}$ and thus completing the pick-up circuit for relay $g^{AE}$, passing from terminal $x$, through contacts $202^{KAE}$, $203^{gAGE}$, $204^{gAD}$, $205^{gAGF}$, $206^{gAF}$, and the winding of relay $g^{AE}$ to terminal $o$. Relay $g^{AE}$, upon becoming energized, completes its stick circuit passing from terminal $x$, through contacts $207^{KA}$, $208^{U2}$, 209 of relay $g^{AE}$, and the winding of relay $g^{AE}$ to terminal $o$.

With relay $g^{AE}$ energized, a circuit is completed for normal switch control relay $e^{2E}$, passing from terminal $x$, through contacts $207^{KA}$, $208^{U2}$, 209 and 211 of relay $g^{AE}$, $212^{ZA}$, and the winding of relay $e^{2E}$ to terminal $o$. With relay $e^{2E}$ energized, polarized switch control relay $m^2$ becomes energized in the normal direction by its circuit shown in Fig. 7, passing from terminal 440 of a battery $gg$, through contacts $373^{e2E}$, $384^{V3W}$, $386^{V2aW}$, $387^{V2E}$, $388^{V2aE}$, $389^{U2}$, $390^{U6}$, and the winding of relay $m^2$ to terminal 441 of battery $gg$. Since switches $H^2$ and $H^{2a}$ are already in their normal position, the normal energization of relay $m^2$ at this time produces no effect on these switches.

Also, since switches $H^2$ and $H^{2a}$ are already in the normal position, relay $i^2$ is energized, and hence normal switch control relay $e^{3E}$ becomes energized by its circuit which is the same as that previously traced for relay $e^{2E}$ as far as contact $212^{ZA}$, thence through contact $213^{i2}$, and the winding of relay $e^{3E}$ to terminal $o$. With relay $e^{3E}$ energized, switch control relay $m^3$ shown in Fig. 7 becomes energized in the normal direction by a circuit through contact $393^{e3E}$ which is similar to the circuit already traced for relay $m^2$ through contact $373^{e2E}$.

Since switches $H^3$ and $H^{3a}$ are already in their normal position, relay $i^3$ is energized and hence normal switch control relay $e^{4E}$ becomes energized by its circuit which is the same as that already described for relay $e^{3E}$ as far as contact $213^{i2}$, thence through contact $214^{i3}$, and the winding of $e^{4E}$ to terminal $o$. Relay $m^4$ shown in Fig. 7 is now also energized in the normal direction by its circuit through contact $426^{e4E}$.

Since switch $H^4$ is already in its normal position, normal indication relay $i^4$ is energized, and hence the circuit for route-complete relay $Z^E$ is now closed and includes the circuit already described for relay $e^{4E}$ as far as contact $214^{i3}$, thence through contacts $215^{i4}$, $216^{EC}$, $217^{gEB}$, $218^{gEGA}$, $219^{gEA}$, and the winding of relay $Z^E$ to terminal $o$.

Relay $Z^E$ upon becoming energized, causes relay $W^{AE}$ to become energized by its circuit passing from terminal $x$, through contacts $207^{KA}$, $208^{U2}$, 209 of relay $g^{AE}$, $210^{ZE}$, and the winding of relay $W^{AE}$ to terminal $o$.

Upon the energization of relay $W^{AE}$, signal control relay $X^1$, shown in Fig. 8, becomes energized by its circuit passing from terminal $x$, through contacts $461^{u5n}$, $462^{QS5}$, $463^{X5}$, $473^{i4}$, $476^{i3}$, $472^{i2}$, $489^{WAE}$, and the winding of relay $X^1$ to terminal $o$.

Relay $X^1$, upon becoming energized opens its contact $27^{X1}$ in the circuits for relay $P^{S1}$ shown in Fig. 1 thereby causing relay $P^{S1}$ to be de-energized. With relay $P^{S1}$ de-energized, the pick-up circuit for relay $L^{S1}$ shown in Fig. 9 is open at contact $47^{PS1}$, but the stick circuit for relay $L^{S1}$ continues closed, and hence relay $L^{S1}$ continues energized.

Upon the de-energization of relay $P^{S1}$, contact $61^{PS1}$ opens the pick-up and stick circuits for relay $V^{2E}$ shown in Fig. 6. Relay $V^{2E}$ being thus de-energized, opens, at its contact $387^{V2E}$, the normal and reverse control circuits for relay $m^2$ shown in Fig. 7. Relay $V^{2E}$ upon becoming de-energized, also opens, at its contact $74^{V2E}$, the pick-up and stick circuits for relay $V^{3E}$. Relay $V^{3E}$ upon becoming de-energized opens, at its contact $405^{V3E}$, the normal and reverse control circuit for relay $m^3$. Relay $V^{3E}$ also opens, at its contact $437^{V3E}$, the control circuits for relay $m^4$.

Relay $X^1$ upon becoming energized, completes the operating circuit for signal $S^{1a}$ passing from terminal $x$, through contacts $514^{X1}$, $515^{JS1}$, $516^{i2}$, $517^{i4}$, $518^{LS1}$, 519 of signal $S^{1b}$, and the mechanism of signal $S^{1a}$ to terminal $o$. The arm of signal $S^{1a}$ then moves to its proceed position.

An eastbound train approaching signal $S^{1a}$ after the route from A to E has been arranged as just described, de-energizes approach track relay $T^1$ which then opens its contact 24 in the circuit for relay $P^{S1}$ which, however, is already open at contacts $27^{X1}$, and 23 of signal $S^{1a}$.

When the train passes signal $S^{1a}$, entering section A—ii, relay $T^2$ opens its contact $37^a$, de-energizing relay $U^2$. Relay $T^2$, after opening its contact $37^a$, closes its contact $37^b$ causing slow release relay $I^2$ to become energized by its circuit passing from terminal $x$, through contact $37^b$ of relay $T^2$, and the winding of relay $I^2$ to terminal $o$.

Relay $U^2$, upon becoming de-energized, opens at its contact $208^{U2}$, the stick circuit for $g^{AE}$ shown in Fig. 4, causing $g^{AE}$ to be de-energized. Contact $208^{U2}$ also opens the circuits for relays $e^{2E}$, $e^{3E}$, $e^{4E}$, $Z^E$ and $W^{AE}$, causing these relays to be de-energized, and thus putting them in condition for the operator to arrange, after the train has moved out of the route, another route which conflicts with the route previously arranged.

Relay $U^2$ upon becoming de-energized, also opens, at its contact $46^{U2}$, the pick-up and stick circuits for relay $L^{S1}$ which, then becoming de-energized, opens its contact $518^{LS1}$ in the circuit previously traced for signal $S^{1a}$. The arm of signal $S^{1a}$ then moves to the "stop" position, closing its contact 23.

Relay $W^{AE}$ upon becoming de-energized, has opened, at its contact $489^{WAE}$, the circuit previously traced for relay $X^1$. Relay $X^1$ upon closing its contact $27^{X1}$, then completes a second pick-up circuit for relay $P^{S1}$, passing from terminal $x$, through contacts 21, 22, and 23 of signals $S^{1c}$, $S^{1b}$ and $S^{1a}$, respectively, contact 26 of relay $U^2$, contact $27^{X1}$, and the winding of relay $P^{S1}$ to terminal $o$. When the train moves out of section $a$—A, relay $T^1$ becomes energized, completing again the pick-up circuit first traced for relay $P^{S1}$ through contact 24 of relay $T^1$.

When the train moves out of section A—ii, relay $T^2$ becomes energized by its pick-up circuit through contact 39 of relay $I^2$. Relay $T^2$ then opens its back contact $37^b$ in the circuit for relay $I^2$, and closes its contact $37^a$ in the circuit for relay $U^2$. After the lapse of a sufficient period of time, relay $I^2$ permits its back contact 38 to complete the circuit previously traced for relay $U^2$, which then becomes energized. With relay $U^2$ energized, relay $V^{2E}$ now becomes energized by its pick-up circuit passing from terminal $x$, through contacts $61^{PS1}$ and $62^{U2}$, and the winding of relay $V^{2E}$ to terminal $o$.

When the train enters section $ii$—$jj$, relay $T^3$, and in turn relay $U^3$, becomes de-energized. Relay $U^3$ upon becoming de-energized, opens its contact $409^{U3}$ in the circuit for relay $m^3$, which is, however, already open at contact $405^{V3E}$. Relay $U^3$ upon becoming de-energized, also opens its contact $76^{U3}$ in the pick-up circuit for relay $V^{3E}$, thus preventing relay $V^{3E}$ from becoming energized as soon as relay $V^{2E}$ closes its contact $74^{V2E}$ in the circuit for relay $V^{3E}$.

When the train leaves section $ii$—$jj$, relay $U^3$ becomes energized after the lapse of a period of time as already described for relay $U^2$ when the train left section A—$ii$. Relay $U^3$ upon becoming energized, closes its contact $76^{U3}$, thus completing the pick-up circuit for relay $V^{3E}$ passing from terminal $x$, through contacts $72^{V3aE}$, $74^{V2E}$, $76^{U3}$, and the winding of relay $V^{3E}$ to terminal $o$.

When the train enters section $jj$—E, relay $U^4$ becomes de-energized, opening its contacts $439^{U4}$ in the circuit for relay $m^4$.

When the train leaves section $jj$—E, relay $T^4$, and in turn relay $U^4$, becomes energized. Relay $L^{S1}$ now again becomes energized by its pick-up circuit previously traced, and contact $439^{U4}$ is closed in the circuit for relay $m^4$, thus completing restoration, to the normal condition of all parts of the apparatus for the control of the route from A to E.

If, after a route has been arranged for a move as, for example, from A to E as previously described, a train has entered the route and it is then desired to provide a call-on signal indication to authorize a second train to enter the route while it is still occupied by the first train, the operator will again depress push button $K^{AE}$, energizing route stick relay $g^{AE}$ by the circuit previously traced. Relays $e^{2E}$, $e^{3E}$, $e^{4E}$, $Z^E$ and $W^{AE}$, will then be successively energized as already described. This time, however, the operator continues to hold push button $K^{AE}$ in the depressed position. With relay $W^{AE}$ energized, relay $X^1$ will again become energized. When relay $X^1$ is energized, and with push button $K^{AE}$ still depressed, the operator will depress call-on push button $K^{S1}$, causing call-on relay $R^{S1}$ to be energized by its pick-up circuit through contact $506^{KS1}$. The operator then ceases to depress push buttons $K^{S1}$ and $K^{AE}$, but relay $R^{S1}$ will continue energized by its stick circuit passing from terminal $x$, through contact $507^{X1}$, $508$ of relay $R^{S1}$, and the winding of relay $R^{S1}$ to terminal $o$. Relay $g^{AE}$ will also continue energized by its stick circuit, which now includes contact $554^{RS1}$ instead of contact $208^{U2}$ as previously traced.

Relay $L^{S1}$ being de-energized by the first train in the route, signal $S^{1a}$ will continue to indicate stop, and signal $S^{1c}$ will now be operated to its proceed position, to serve as a call-on signal, by means of its circuit passing from terminal $x$, through contacts $514^{X1}$, $515^{JS1}$, $516^{i2}$, $517^{i4}$, $526^{RS1}$, contact $528$ of signal $S^{1a}$, $529$ of signal $S^{1b}$, and the mechanism of signal $S^{1c}$ to terminal $o$. Since the circuit just traced for signal $S^{1c}$ does not include a contact of stick relay $L^{S1}$ or of any other traffic controlled relay, and since contact $554^{RS1}$ is now closed around contact $208^{U2}$ in the stick circuit for relay $g^{AE}$, the arm of signal $S^{1c}$ is not caused to return to its stop position by the entrance of the second train into the route. Signal $S^{1c}$ will therefore continue to display the call-on indication until the operator depresses push button $K^A$ thereby breaking contact $207^{KA}$ in the stick circuit for relay $g^{AE}$ and returning to the normal condition all apparatus for controlling the route.

The purpose of controlling each relay U by a corresponding slow-release relay I and of controlling various parts of the apparatus by a relay U instead of by the corresponding relay T is to prevent the possibility of a momentary loss of track circuit shunt releasing a portion of the apparatus. For example, while a single motor car is moving through section A—$ii$, relay $T^2$ might become momentarily energized due to such a loss of track circuit shunt. During such a brief period of energization of relay $T^2$, relay $I^2$ does not permit its contact $38$ to close, and hence there is not time for relay $U^2$ to become energized before relay $T^2$ again opens its contact $37^a$ in the circuit for relay $U^2$.

I will now assume that with all parts of the apparatus again in their normal condition as previously described, the operator arranges route $I$ for a move from A to E, and clears signal $S^{1a}$ as also previously described, by depressing push button $K^{AE}$. If now, after an eastbount train enters section $a$—A, de-energizing relay $T^1$, the operator should desire to send the train over some other route than route $I$, he will depress push button $K^A$, thereby de-energizing route control relay $g^{AE}$, and also relays $e^{2E}$, $e^{3E}$, $e^{4E}$, $Z^E$ and $W^{AE}$. Relay $W^{AE}$ then de-energizes relay $X^1$, causing the arm of signal $S^{1a}$ to move to the stop position.

On account of relay $T^1$ being de-energized by the train in section $a$—A, relay $P^{S1}$ does not pick-up when the arm of signal $S^{1a}$ is returned to its stop position. In order eo energize relay $P^{S1}$, the operator will start the operation of time release $J^{S1}$. Contact $515^{JS1}$ in the circuits for signals $S^1$ shown in Fig. 11 will immediately open, and after the lapse of a measured interval of time, contact $25$ of release $J^{S1}$ will close, causing relay $P^{S1}$ to become energized by a third pick-up circuit passing from terminal $x$, through contacts $21$, $22$, and $23$ of signals $S^{1c}$, $S^{1b}$, and $S^{1a}$ respectively, contact $25$ of release $J^{S1}$, contact $27^{X1}$, and the winding of relay $P^{S1}$ to terminal $o$. With relay $P^{S1}$ energized, relays $V^{2E}$ and $V^{3E}$ will become energized, and hence the operator can now proceed to arrange any other route originating at point A, but signal $S^{1b}$ or $S^{1c}$ will not be operated to the proceed position for governing over such a route until the operator restores the contacts of release $J^{S1}$ to their normal position.

Assuming that the operator wishes to send the train, which has arrived in section $a$—A, over route 2 from A to F, he will depress push button $K^{AF}$, causing relay $g^{AF}$ to be energized by its pick-up circuit through contact $292^{KAF}$. Relay $g^{AF}$, upon closing its contacts $299$ and $301$, causes the energization, successively, of relays $e^{2F}$, $e^{3F}$ and $f^{4F}$, similarly to the manner already described in connection with the control for a move from A to E.

Relay $f^{4F}$, upon becoming energized, causes relay $m^4$ to be energized in the reverse direction by a circuit passing from terminal $441$ of a battery $hh$, through the winding of relay $m^4$, and contacts $439^{U4}$, $438^{V4W}$, $437^{V3E}$, and $434^{f4F}$ to terminal $442$ of battery $hh$. With relay $m^4$ energized in the reverse direction, motor $M^4$ is supplied with current for moving switch $H^4$ to its reverse position, such current passing from battery 13, through contact 443$^{m4}$ closed in its reverse position, armature 444 of motor M$^4$, asymmetric unit $b^2$, field winding 445 of motor M$^4$, contact 446 of circuit controller $y^4$, asymmetric unit $b^4$, and contact 447$^{m4}$ closed in its reverse position, back to battery 13. During the movement of switch H$^4$ from its normal to its reverse position, indication relay $h^4$ is shunted by a circuit including contacts 5—5$^c$ and 6$^c$—6 of circuit controller $y^4$. Upon the completion of the operation of switch H$^4$ to its reverse position, relay $h^4$ is energized in the reverse direction by a circuit passing from terminal $x$, through contact 6$^b$—6 of circuit controller $y^4$, winding of relay $h^4$, and contact 5—5$^b$ of circuit controller $y^4$ back to terminal $o$. Reverse indication relay $t^4$ now becomes energized by its circuit passing from battery 13, through contact 14$^{m4}$ closed in the reverse position, contacts 18 and 19 of relay $h^4$, contact 20 of relay $i^4$, and the winding of relay $t^4$ back to battery 13.

With relay $t^4$ energized, the circuit for relay Z$^F$ is completed through contact 305$^{t4}$, causing relay Z$^F$ to become energized. Upon the energization of relay Z$^F$, relay W$^{AF}$ becomes energized by its circuit passing from terminal $x$, through contacts 297$^{KA}$, 298$^{U2}$, 299 of relay $g^{AF}$, 300$^{ZF}$, and the winding of relay W$^{AF}$ to terminal $o$. With relay W$^{AF}$ energized, relay X$^1$ shown in Fig. 8 becomes energized by its circuit passing from terminal $x$, through contacts 464$^{u6n}$, 465$^{QS6}$, 466$^{X6}$, 475$^{t4}$, 476$^{i3}$, 472$^{i2}$, 491$^{WAF}$, and the winding of relay X$^1$ to terminal $o$.

The arm of signal S$^{1c}$ is now operated to its proceed position by its circuit passing from terminal $x$, through contacts 514$^{X1}$, 515$^{JS1}$, 516$^{i2}$, 525$^{t4}$, 528 of signal S$^{1a}$, 529 of signal S$^{1b}$, and the mechanism of signal S$^{1c}$ to terminal $o$. When the arm of signal S$^{1c}$ leaves its stop position, approach locking relay P$^{S1}$ becomes de-energized by the opening of contact 21 of signal S$^{1c}$ shown in Fig. 1$^a$. If now a train moves over the route from A to F, the control apparatus will be restored to its normal condition similarly to the manner described in connection with a move through the route from A to E. Switch H$^4$, however, will continue in its reverse position until the operator causes it to be returned to the normal position by the operation of a push button K for the control of some route which includes switch H$^4$ in its normal position, or unless the operator moves lever $k^4$ to its $n$ position.

If the operator moves lever $k^4$ to its $n$ position, relay $m^4$ shown in Fig. 7 will be energized in the normal direction by its circuit passing from terminal 440 of battery $gg$, through contacts 425$^{k4n}$, 437$^{V3E}$, 438$^{V4W}$, 439$^{U4}$, and the winding of relay $m^4$ to terminal 441 of battery $gg$. Switch motor M$^4$ will now be supplied with current in the normal direction for operating switch H$^4$ to the normal position by its circuit passing from battery 13, through normal contact 447$^{m4}$, asymmetric unit $b^1$, field winding 445 of motor M$^4$, contact 448 of circuit controller $y^4$, asymmetric unit $b^3$, armature 444 of motor M$^4$, and normal contact 443$^{m4}$ back to battery 13. Upon the completion of the movement of switch H$^4$ to its normal position, normal indication relay $i^4$ will become energized by its circuit previously traced.

Assuming now that all parts of the apparatus are again in their normal condition as previously described, and that the operator desires to arrange for a traffic move over route 3 from A to D, he will depress push button K$^{AD}$, causing energization of relay $g^{AD}$ by its pick-up circuit including contact 112$^{KAD}$ as shown in Fig. 3. Relay $g^{AD}$, upon becoming energized, completes its stick circuit through contact 117$^{KA}$. Relay $g^{AD}$, upon becoming energized, causes energization, successively, of relays $f^{2D}$, $e^{3D}$, Z$^D$ and W$^{AD}$ similarly to the manner already described in connection with the control for a move from A to F. With relay W$^{AD}$ energized, relay X$^1$ becomes energized by its circuit passing from terminal $x$, through contacts 458$^{u4n}$, 459$^{PS4}$, 460$^{X4}$, 469$^{i3}$, 471$^{t2}$, 487$^{WAD}$, and the winding of relay X$^1$ to terminal $o$. The arm of signal S$^{1b}$ is now operated to its proceed position by its circuit passing from terminal $x$, through contacts 514$^{X1}$, 515$^{JS1}$, 520$^{t2}$, 521$^{i3}$, 522$^{LS1}$, 523 of signal S$^{1a}$, and the mechanism of signal S$^{1b}$ to terminal $o$.

I will next assume that all parts of the apparatus are again in the normal condition, and that the operator wishes to send a train by route 4 from A to E. He therefore depresses push button K$^{AGE}$, causing relay $g^{AGE}$ to be energized by its pick-up circuit through contact 189$^{KAGE}$. Relay $g^{AGE}$, upon becoming energized, completes its stick circuit through contact 194$^{KA}$. Relay $g^{AGE}$, upon becoming energized, also causes relays $f^{2E}$, $f^{3E}$, $e^{4E}$, Z$^E$, and W$^{AGE}$ to be energized successively, similarly to the manner already described in connection with route 2 from A to F. With relays $f^{2E}$ and $f^{3E}$ energized, switches H$^2$, H$^{2a}$, H$^{3a}$ and H$^3$ all become reversed, and with relay $e^{4E}$ energized, switch H$^4$ is in its normal position. With relay W$^{AGE}$ energized, relay X$^1$ becomes energized by its circuit passing from terminal $x$, through contacts 461$^{u5n}$, 462$^{QS5}$, 463$^{X5}$, 473$^{i4}$, 474$^{t3}$, 471$^{t2}$, 488$^{WAGE}$, and the winding of relay X$^1$ to terminal $o$. The arm of signal S$^{1c}$ is now operated to the proceed position by its circuit passing from terminal $x$, through contacts 514$^{X1}$, 515$^{JS1}$, 520$^{t2}$, 524$^{t3}$, 528 of signal S$^{1a}$, 529 of signal S$^{1b}$, and the mechanism of signal S$^{1c}$ to terminal $o$.

Relay P$^{S1}$ becomes de-energized by the opening of contact 21 when the arm of signal S$^{1c}$ leaves the stop position. Route locking relay V$^{2E}$, shown in Fig. 6, is then de-energized by the opening of contact 61$^{PS1}$. Since switches H$^2$ and H$^{2a}$ are reversed, normal indication relay $i^2$ is de-energized, and hence route locking relay V$^{2aE}$ is de-energized, since contact 66$^{i2}$ is open on account of relay $i^2$ being de-energized and contact 65$^{V2E}$ is open on account of relay V$^{2E}$ being de-energized. With relay V$^{2aE}$ de-energized, relay V$^{3aE}$ is also de-energized on account of contact 69$^{V2aE}$ in its pick-up and stick circuits being open. On account of relay V$^{3aE}$ being de-energized, contact 72$^{V3aE}$ is open in the circuits for relay V$^{3E}$, and on account of switches H$^3$ being reversed and hence normal indication relay $i^3$ being de-energized, contact 73$^{i3}$ is also open in the circuits for relay V$^{3E}$, and hence relay V$^{3E}$ is de-energized. With relays V$^{2E}$ and V$^{2aE}$ de-energized, contacts 387$^{V2E}$ and 388$^{V2aE}$ are open in the circuits for relay $m^2$ shown in Fig. 7, and with relays V$^{3E}$ and V$^{3aE}$ de-energized, contacts 405$^{V3E}$ and 406$^{V3aE}$ are open in the circuits for relay $m^3$ and contact 437$^{V3E}$ is open in the circuits for relay $m^4$.

In order to arrange for a move from B to D when all parts of the apparatus have been again returned to their normal condition, the operator will depress push button K$^{BD}$, causing relay $g^{BD}$ to be energized by its pick-up circuit through contact 103$^{KBD}$. With relay $g^{BD}$ energized, relays $e^{1D}$, $e^{2D}$, $e^{3D}$, Z$^D$, and W$^{BD}$ are successively energized as already described in connection with a move from A to E. With relay W$^{BD}$ energized, relay X$^2$ becomes energized by its circuit passing from terminal x, through contacts 458$^{u4n}$, 459$^{PS4}$, 460$^{X4}$, 469$^{13}$, 468$^{12}$, 470$^{11}$, 483$^{WBD}$, and the winding of relay X$^2$ to terminal o. With relay X$^2$ energized, the arm of signal S$^2$ is operated to its proceed position by its circuit passing from terminal x, through contact 513$^{X2}$, and the mechanism of signal S$^2$ to terminal o. When the arm of signal S$^2$ leaves its stop position, stick locking relay Q$^{S2}$ is de-energized by the opening of contact 28 of signal S$^2$.

If a train passes signal S$^2$ into section B—mm, relay T$^5$ and, in turn, relay U$^5$ become deenergized. As soon as the arm of signal S$^2$ returns to its stop position on account of the de-energization of relay W$^{BD}$ by contact 107$^{U5}$, relay Q$^{S2}$ will become energized by its pick-up circuit passing from terminal x, through contacts 28 of signals S$^2$, 29$^{X2}$, and 30$^{U5}$, and the winding of relay Q$^{S2}$ to terminal o.

If on the other hand, before a train passes signal S$^2$, the operator desires to arrange some other route, he will return the arm of signal S$^2$ to its stop position by depressing push button K$^B$ and thus opening contact 106$^{KB}$ in the stick circuit for relay g$^{BD}$, and causing relays e$^{1D}$, e$^{2D}$, e$^{3D}$, Z$^D$, and W$^{BD}$ to be de-energized. With the arm of signal S$^2$ returned to its stop position, winding 31 of thermal relay N$^{S2}$ which is associated with relay Q$^{S2}$, becomes energized by its circuit passing from terminal x, through contact 28 of signal S$^2$, contact 29$^{X2}$, winding 31 of relay N$^{S2}$, and contact 34 of relay Q$^{S2}$ to terminal o. Upon the lapse of a sufficient period of time, relay N$^{S2}$ then closes its contact 32, completing a second pick-up circuit for relay Q$^{S2}$ passing from terminal x, through contact 28 of signal S$^2$, contact 29$^{X2}$, contact 32 of relay N$^{S2}$, and the winding of relay Q$^{S2}$ to terminal o. With relay Q$^{S2}$ now energized, the operator can arrange any route he desires.

I make no claim to invention of the control of stick locking relays Q by thermal relays N, such an arrangement having been previously disclosed by Messrs. Charles A. Brooks and John M. Pelikan. The invention by Messrs. Brooks and Pelikan is shown, described and claimed in their application for Letters Patent of the United States, Serial No. 398,301, filed Oct. 9, 1929, for Railway traffic controlling apparatus, now Patent No. 1,956,851, granted May 1, 1934.

I have described for a few typical traffic moves the operation of the apparatus embodying my invention. From those descriptions and from the preceding general description, the operation of the apparatus for every other possible traffic move will be readily understood by reference to the drawings.

From the examples of operation cited, it is clear that in order to arrange any route and clear the signal for a given direction of traffic over such route, the operator has only to depress one push button. When a train has moved through the route, the route control apparatus is automatically restored to the normal condition. If, however, the operator wishes to return a signal to the stop position or to prepare to change the route before a train arrives, he can do so by depressing a second push button. He can then arrange another route by depressing a third push button.

Interlocking of the routes is accomplished in various steps. For example, when relay g$^{CE}$, shown in Fig. 4, is energized, relays g$^{CD}$ and g$^{CF}$ for routes which originate at the same point C can not be energized because of the back contacts of relay g$^{CE}$ which are included in the circuits for relays g$^{CD}$ and g$^{CF}$. Contact 176$^{ZC}$ prevents control of any switches by relay g$^{CE}$ when route-complete relay Z$^C$ is energized for any conflicting route which ends at point C. Contacts 216g$^{EC}$, 217g$^{EB}$, 218g$^{EGA}$, and 219g$^{EA}$ prevent control of route-complete relay Z$^E$ by relay g$^{CE}$ when any one of the route relays g$^{EC}$, g$^{EB}$, g$^{EGA}$ and g$^{EA}$, respectively, is energized for a conflicting route which begins at point E.

Levers k and u, shown in Fig. 2, could, if desired, be omitted from apparatus comprising my invention. Even if these were omitted, the various routes would be completely and hence safely interlocked.

The push buttons K, shown in Fig. 2, except push buttons K$^{S1}$ and K$^{S4}$ could, if desired, be omitted when levers k and u are used. Relays g, e f, Z and W, and the circuits shown for these relays in Figs. 3, 4 and 5, would then also be omitted. Complete interlocking protection would then be provided by the circuits of Figs. 7 and 8, from which the contacts operated by relays e, f and W would be omitted.

From the circuits of Fig. 8, it is clear that conflicting signal indications cannot be displayed. My invention further provides that the switches shall be successively arranged in each route, and that no signal can be cleared until each switch within the route governed by the signal is in the correct position.

As has been described, my invention provides approach or stick locking, and detector track circuit locking as well as route locking and signal indication locking for all switches.

Although I have herein shown and described only one form of multiple control apparatus embodying my invention, it is understood that various changes and modifications may be made therein within the scope of the appended claims without departing from the spirit and scope of my invention.

Having thus described my invention, what I claim is:

1. In combination, an electrical device responsive to the polarity of current supplied thereto, a plurality of electro-responsive devices including said electrical device, a manually operable device, means controlled by said manually operable device for controlling the energization of said electro-responsive devices successively and of said electrical device by current of a given polarity, a second manually operable device, means controlled by said second manually operable device independently of said first manually operable device for energizing said electrical device by current of the opposite polarity, a second electrical device, and means controlled by said first electrical device for operating said second electrical device in a first or a second manner according as said first electrical device is controlled by said first manually operable device or by said second manually operable device.

2. In combination, an electrical device responsive to the polarity of current supplied thereto, a plurality of electro-responsive devices including said electrical device, a manually operable device, means controlled by said manually operable device for controlling the energization of said electro-responsive devices successively and of said electrical device by current of a given polarity, means controlled independently of said manually operable device for energizing said electrical device by current of the opposite polarity, a second electrical device, and means controlled by said first electrical device for operating said second electrical device in a first or a second manner according as said first electrical device is controlled by said manually operable device or by said independent means.

3. In combination, a plurality of partly inter-inclusive groups of traffic governing devices, a manually operable device for each of said groups, a second manually operable device for each of said groups operated independently of the first manually operable device for the same group, a stick relay for each of said groups, a pick-up circuit for each of said stick relays controlled by the said first manually operable device for the same group, a stick circuit for each of said stick relays controlled by the said second manually operable device for the same group, and means controlled by each of said stick relays for energizing the traffic governing devices in its group successively.

4. In combination, a plurality of partly inter-inclusive groups of energy-responsive devices, a first and a second manually operable device for each of said groups, a stick relay for each of said groups, a pick-up and a stick circuit for each of said relays controlled by the first and second manually operable devices respectively for the same group, means controlled by each said relay for energizing the energy-responsive devices in its group successively, and means controlled by each said relay for preventing the energization of the energy-responsive devices of certain other said groups.

5. In combination, a plurality of partly inter-inclusive groups of energy-responsive devices, a manually operable device for each of said groups, a second manually operable device for each of said groups, a stick relay for each group, a pick-up circuit for each stick relay controlled by the first manually operable device of its group for energizing the energy-responsive devices in its group successively, means controlled by each said first manually operable device for preventing the energization of a device in each of certain other said groups, and a stick circuit for each stick relay controlled by the second manually operable device of its group for continuing the energization of the energy-responsive devices of said group.

6. In combination, a stretch of railway track including a plurality of track switches capable of arrangement into a plurality of routes for directing traffic through said stretch, a manually operable device for each of said routes, a stick relay for each of said routes each having a pick-up and a stick circuit one of which is controlled by the manually operable device for its route and the other of which is controlled by a second device, and means controlled by each of said relays for arranging the switches in its route successively.

7. In combination, a stretch of railway track including a plurality of track switches capable of arrangement into a plurality of routes for directing traffic through said stretch, a manually operable device for each of said routes, a stick relay for each of said routes each having a pick-up and a stick circuit one of which is controlled by the manually operable device for its route and the other of which is controlled by a second device, means controlled by each of said relays for arranging the switches in its route successively, and means controlled by each of said devices for preventing operation of a switch in each of certain other said routes.

8. In combination, a stretch of railway track including a plurality of track switches capable of arrangement into a plurality of routes for directing traffic through said stretch, a plurality of manually operable devices, a stick relay for each of said routes each having a pick-up and a stick circuit one of which is controlled by one of said manually operable devices and the other of which is controlled by a second device, and interlocking means controlled by said relays for arranging the switches successively in said routes.

9. In combination, a stretch of railway track, a route including a plurality of track switches for directing traffic through said stretch, a manually operable device, a stick relay having a pick-up and a stick circuit one of which is controlled by said manually operable device and the other of which is controlled by a second device, and means controlled by said relay for arranging the switches in said route successively.

10. In combination, a stretch of railway track, a route including a plurality of track switches for directing traffic through said strength, a manually operable device, means controlled by said device for arranging the switches in said route successively, a route-complete relay, means controlled by said device for energizing said route-complete relay when all the switches in said route are in the positions required for said route, a signal for said route, and means controlled by said route-complete relay for clearing said signal.

11. In combination, a stretch of railway track, a route including a plurality of track switches for directing traffic through said stretch, a manually operable device for each direction of traffic over said route, means controlled by each of said devices for arranging the switches successively in said route, a route-complete relay for each said direction of traffic over said route, means controlled by each of said devices for energizing the said route-complete relay for its direction of traffic when all the switches in said route are in the positions required for said route, a signal for each direction of traffic over said route, and means controlled by each of said route-complete relays for clearing the said signal for its direction of traffic.

12. In combination, a stretch of railway track, a route including a plurality of track switches for directing traffic through said stretch, a manually operable device for each direction of traffic over said route, a route-complete relay for each direction of traffic over said route, means controlled by each of said devices for energizing the said route-complete relay for its direction of traffic when all the switches in said route are in the positions required for a traffic movement over said route, and means controlled by each of said devices for arranging the switches successively in said route when the route-complete relay for the opposite direction of traffic is de-energized.

13. In combination, a stretch of railway track including a plurality of partly inter-inclusive routes, a stick relay for each of said routes, a manually operable device for each of said stick relays, a second manually operable device for each of said stick relays, a pick-up circuit for each of said stick relays controlled by its said first manually operable device when certain other said stick relays are deenergized, a stick circuit for each of said stick relays controlled by its said second manually operable device, and means controlled by each of said stick relays for arranging the switches in its route.

14. In combination, a stretch of railway track, a signal for governing traffic movements over said stretch, a stick relay, a pick-up circuit for said relay controlled by traffic conditions, a stick circuit for said relay controlled by said signal, a second signal for governing traffic movements over said stretch, and means controlled by said stick relay for permitting said second signal to indicate "proceed" only when said relay is energized.

15. In combination, a stretch of railway track containing a switch, a signal associated with said switch, a stick relay, a pick-up circuit for said relay controlled by traffic conditions and by said signal, a stick circuit for said relay controlled by said signal, a second stick relay, a pick-up circuit for said second stick relay controlled by traffic conditions, a stick circuit for said second stick relay controlled by said first stick relay, and a switch relay controlled by said second stick relay for controlling said switch.

16. In combination, a stretch of railway track containing a switch, a signal associated with said switch, a stick relay, a pick-up circuit for said relay controlled by traffic conditions, a stick circuit for said relay controlled by said signal, a second stick relay, a pick-up circuit for said second relay controlled by traffic conditions and by said first stick relay, a stick circuit for said second stick relay controlled by said first stick relay, and a switch relay controlled by a front contact of said second stick relay for controlling said switch.

17. In combination, a stretch of railway track, a track circuit for said stretch including a track relay, a slow-release relay controlled by a back contact of said track relay, a repeater relay controlled by a back contact of said slow-release relay and by front contact of said track relay, a front contact of said slow-release relay and a front contact of said track relay connected in multiple with each other but in series with the winding of said track relay, and a traffic governing device controlled by said repeater relay.

18. In combination, a stretch of railway track, a track circuit for said stretch including a track relay, a slow-release relay controlled by a back contact of said track relay, a repeater relay controlled by a back contact of said slow-release relay and by a front contact of said track relay, and a traffic governing device controlled by said repeater relay.

19. In combination, a plurality of railway track switches which can be arranged to form a plurality of routes over a given stretch of track, a control device for each of said routes, means controlled by each of said control devices for operating all the switches in its route, an auxiliary control device for each of said switches, and means controlled by each of said auxiliary control devices for controlling its switch independently of the first control devices which control the same operation of said switch.

20. In combination, a railway track switch, a polarized switch relay for controlling operation of said switch to one position or another according as said relay is energized in a normal or a reverse direction, a polarized indication relay energized in a normal or a reverse direction according as said switch is in said first or said second position, a normal indication relay, a reverse indication relay controlled by a reverse polar contact of said switch relay and by a reverse polar contact of said polarized indication relay as well as by a back contact of said normal indication relay, means controlled by a normal polar contact of said switch relay and by a normal polar contact of said polarized indication relay as well as by a back contact of said reverse indication relay for controlling said normal indication relay, and indication means controlled by said normal and reverse indication relays.

21. In combination, a railway track switch, a signal for governing traffic movements over said switch, a signal relay, manually controlled means for controlling said relay, a locking relay, a circuit including a contact operated by said signal and a contact operated by said signal control relay for controlling said locking relay, a time releasing device, a circuit including a contact operated by said signal and a contact operated by said signal control relay for controlling said time releasing device, a second circuit for controlling said locking relay controlled by said time releasing device, means controlled by said locking relay for controlling said switch, and means controlled by said signal relay for controlling said signal.

22. In combination, a railway track switch, a signal for governing traffic movements over said switch, a signal relay, a manually operable device, a circuit including said device and said relay for controlling said relay, a time releasing instrument, a circuit including a contact of said relay for controlling said instrument, a switch relay, a circuit including said switch relay and a contact of said signal as well as a contact of said signal relay and a contact of said time releasing instrument for controlling said switch relay, means controlled by said switch relay for controlling said switch, and means controlled by said signal relay for controlling said signal.

23. In combination, a railway track switch, a signal for governing traffic movements over said switch, a signal relay, a manually operable device, a circuit including said device and said relay for controlling said relay, a time releasing instrument, a circuit including a contact of said relay for controlling said instrument, a circuit including a contact of said signal and a contact of said signal relay as well as a contact of said time releasing instrument for controlling said switch, and means controlled by said signal relay for controlling said signal.

24. In combination, a railway track switch, a signal for governing traffic movements over said switch, a signal relay, means controlled by said switch for controlling said signal relay, a time releasing instrument, a circuit including a contact of said signal relay for controlling said instrument, a circuit including a contact of said signal and a contact of said instrument for controlling said switch, and means controlled by said signal relay for controlling said signal.

25. In combination, a railway track switch, a signal for governing traffic movements over said switch, a signal relay, means controlled by said switch for controlling said relay, a time releasing instrument, a circuit including a contact of said relay for controlling said instrument, a circuit including a contact of said signal and a contact of said signal relay as well as a contact of said instrument for controlling said switch, and means controlled by said signal relay for controlling said signal.

26. In combination, a railway track switch, a signal for governing traffic movements over said switch, a signal relay, a manually controllable device, means controlled by said device for controlling said relay, a switch relay, a time releasing instrument, a circuit including said instrument and a contact of said signal for controlling said instrument, a circuit including said switch relay and a contact of said signal relay as well as a contact of said instrument for controlling said switch relay, means controlled by said switch relay for controlling said switch, and means controlled by said signal relay for controlling said signal.

27. In combination, a stretch of railway track, a signal for governing traffic movements over said stretch, a second signal for governing traffic movements over said stretch, a control relay for said first signal, means including a front contact of said relay for controlling said first signal, and a circuit including a contact of said first signal and a back contact of said relay for controlling said second signal.

28. In combination, a stretch of railway track, a signal for governing traffic movements over said stretch, a second signal for governing traffic movements over said stretch, a stick relay, a time releasing instrument, a pick-up circuit and a stick circuit for said relay one of which is controlled by said instrument and the other of which is controlled by said first signal, and means for causing said second signal to indicate "proceed" only when said relay is energized.

29. In combination, a stretch of railway track, a signal for governing traffic movements over said stretch, a second signal for governing traffic movements over said stretch, a stick relay, a time releasing instrument, a pick-up circuit and a stick circuit for said relay one of which is controlled by said instrument and the other of which is controlled by said first signal, a signal relay, a circuit including a front contact of said stick relay for controlling said signal relay, and a circuit including a front contact of said signal relay for controlling said second signal.

30. In combination, a stretch of railway track, a signal for governing traffic movements over said stretch, a second signal for governing traffic movements over said stretch, a signal relay, means controlled by said relay for controlling said first signal, a stick relay, a time releasing instrument, a pick-up circuit and a stick circuit for said stick relay one of which is controlled by said instrument and the other of which is controlled by said first signal and by said signal relay, and means for causing said second signal to indicate "proceed" only when said stick relay is energized.

31. In combination, a stretch of railway track, a signal for governing traffic movements over said stretch, a second signal for governing traffic movements over said stretch, a time releasing instrument, means controlled by said first signal for controlling said instrument, a stick relay, control means for controlling said first signal, a pick-up circuit and a stick circuit for said relay one of which is controlled by said instrument and the other of which is controlled by said control means for the first signal, and means for causing said second signal to indicate "proceed" only when said stick relay is energized.

32. In combination, a stretch of railway track including a switch, a signal for governing traffic movements over said switch, a manually controlled signal relay, means controlled by said signal relay for controlling said signal, a time element device, a stick relay, means controlled by said signal and by said signal relay as well as by said stick relay for controlling said time element device, a pick-up circuit for said stick relay controlled by said time element device, a stick circuit for said stick relay controlled by said signal relay, and means controlled by said stick relay for controlling said switch.

33. In combination, a stretch of railway track including a switch, a signal for governing traffic movements over said switch, a manually controlled signal relay, means including a front contact of said relay for controlling said signal, a time element device, a circuit controlled by said signal and including a back contact of said relay for controlling said time element device, and means controlled by said time element device for controlling said switch.

34. In combination, a stretch of railway track, a signal for governing traffic movements into said stretch, a second signal for governing traffic movements into said stretch, a manually controlled signal relay, means controlled by said signal relay for controlling said first signal, a time element device, means controlled by said signal relay and by said first signal for controlling said time element device, and means controlled by said time element device for controlling said second signal.

35. In combination, a stretch of railway track, a track circuit for said stretch including a track relay, a signal for governing traffic movements over said stretch, a stick relay, a pick-up and a stick circuit for said stick relay one of which is controlled by said track relay and the other of which is controlled by said signal, a second signal for governing traffic movements over said stretch, and means for causing said second signal to display a proceed indication only when said stick relay is energized.

36. In combination, a stretch of railway track, a track circuit for said stretch including a track relay, a signal for governing traffic movements over said stretch, a stick relay, a manually controlled relay, a circuit including a front contact of said manually controlled relay for at times causing said signal to display a proceed indication, a pick-up and a stick circuit for said stick relay one of which is controlled by said track relay and by said signal and the other of which is controlled by a back contact of said manually controlled relay, a second signal for governing traffic movements over said stretch, and means for causing said second signal to display a proceed indication only when said stick relay is energized.

37. In combination, a stretch of railway comprising a first and a second track, a track switch interconnecting said first and second tracks, a manually controlled relay, a circuit controlled by a front contact of said manually controlled relay for causing said switch to be operated to a first extreme position for directing traffic movements to or from said first track, a manually operable contact biased to an open position, a second manually operable contact biased to a closed position, a stick relay, a pick-up and a stick circuit for said stick relay one of which is controlled by said first manually operable contact and by a back contact of said manually controlled relay and the other of which is controlled by said second manually operable contact, and means controlled by said stick relay for operating said switch to its other extreme position for directing traffic movements to or from said second track.

38. In combination, a stretch of railway comprising a first and a second track, a track switch interconnecting said first and second tracks, a manually controlled relay, a circuit controlled by a front contact of said manually controlled relay for causing said switch to be operated to a first extreme position for directing traffic movements to or from said first track, a manually operable contact biased to an open position, a track circuit for said switch including a track relay, a stick relay, a pick-up and a stick circuit for said stick relay one of which is controlled by said first manually operable contact and by a back contact of said manually controlled relay and the other of which is controlled by said track relay, and means controlled by said stick relay for operating said switch to its other extreme position for directing traffic movements to or from said second track.

39. In combination, a stretch of railway comprising a first and a second track, a track switch interconnecting said first and second tracks, a first and a second manually operable contact each of which is biased to an open position, a third and a fourth manually operable contact each of which is biased to a closed position, a first and a second stick relay, a pick-up and a stick circuit for said first stick relay one of which is controlled by said first manually operable contact and by a back contact of said second stick relay and the other of which is controlled by said third manually operable contact, a pick-up and a stick circuit for said second stick relay one of which is controlled by said second manually operable contact and by a back contact of said first stick relay and the other of which is controlled by said fourth manually operable contact, means controlled by said first stick relay for operating said switch to a first extreme position for directing traffic movements to or from said first track, and means controlled by said second stick relay for operating said switch to its other extreme position for directing traffic movements to or from said second track.

40. In combination, a stretch of railway comprising a first and a second track, a track switch interconnecting said first and second tracks, a first and a second manually operable contact each of which is biased to an open position, a track circuit for said switch including a track relay, a first and a second stick relay, a pick-up and a stick circuit for said first stick relay one of which is controlled by said first manually operable contact and by a back contact of said second stick relay and the other of which is controlled by said track relay, a pick-up and a stick circuit for said second stick relay one of which is controlled by said second manually operable contact and by a back contact of said first stick relay and the other of which is controlled by said track relay, means controlled by said first stick relay for operating said switch to a first extreme position for directing traffic movements to or from said first track, and means controlled by said second stick relay for operating said switch to its other extreme position for directing traffic movements to or from said second track.

41. In combination with a switch machine for operating a track switch, a circuit controller actuated by the switch machine and having normal contacts closed only when the switch is locked normal and reverse contacts closed only when the switch is locked reversed, control means adapted when in normal position to operate the switch from reverse to normal and when in reverse position to operate the switch from normal to reverse, normal and reverse indication relays; a circuit for the normal indication relay including said normal contacts, a contact closed only when the control means is in normal position, and a back contact of the reverse indication relay; a circuit for the reverse indication relay including said reverse contacts, a contact closed only when the control means is in reverse position and a back contact of the normal indication relay; signals governing traffic over said switch, and means for selectively controlling said signals by said indication relays.

42. In combination with a switch machine for operating a track switch, a normal and a reverse indication relay, a circuit for the normal indication relay closed only when the switch is locked in normal position and the reverse indication relay is in its deenergized position, a circuit for the reverse indication relay closed only when the switch is locked in reverse position and the normal indication relay is in its deenergized position, and signals selectively controlled by each of the indication relays for governing traffic over the switch.

43. In combination, a stretch of railway comprising a first and a second track, a track switch interconnecting said first and second tracks, a manually controlled relay, a circuit controlled by a front contact of said manually controlled relay for causing said switch to be operated to a first extreme position for directing traffic movements to or from said first track, a manually operable contact biased to an open position, a second manually operable contact biased to a closed position, a stick relay, a pick-up and a stick circuit for said stick relay one of which is controlled by said first manually operable contact and by a back contact of said manually controlled relay and the other of which is controlled by said second manually operable contact, means controlled by said stick relay for operating said switch to its other extreme position for directing traffic movements to or from said second track, a signal for governing traffic movements over said switch, and means controlled by said stick relay for clearing said signal.

44. In combination, a stretch of railway comprising a first and a second track, a track switch interconnecting said first and second tracks, a manually controlled relay, a circuit controlled by a front contact of said manually controlled relay for causing said switch to be operated to a first extreme position for directing traffic movements to or from said first track, a manually operable contact biased to an open position, a track circuit for said switch including a track relay, a stick relay, a pick-up and a stick circuit for said stick relay one of which is controlled by said first manually operable contact and by a back contact of said manually controlled relay and the other of which is controlled by said track relay, means controlled by said stick relay for operating said switch to its other extreme position for directing traffic movements to or from said second track, a signal for governing traffic movements over said switch, and means controlled by said stick relay for clearing said signal.

45. In combination, a stretch of railway comprising a first and a second track, a track switch interconnecting said first and second tracks, a first and a second manually operable contact each of which is biased to an open position, a third and a fourth manually operable contact each of which is biased to a closed position, a first and a second stick relay, a pick-up and a stick circuit for said first stick relay one of which is controlled by said first manually operable contact and by a back contact of said second stick relay and the other of which is controlled by said third manually operable contact, a pick-up and a stick circuit for said second stick relay one of which is controlled by said second manually operable contact and by a back contact of said first stick relay and the other of which is controlled by said fourth manually operable contact, means controlled by said first stick relay for operating said switch to a first extreme position for directing traffic movements to or from said first track, means controlled by said second stick relay for operating said switch to its other extreme position for directing traffic movements to or from said second track, a signal for governing traffic movements over said switch, and means controlled by said second stick relay for clearing said signal.

46. In combination, a stretch of railway comprising a first and a second track, a track switch interconnecting said first and second tracks, a first and a second manually operable contact each of which is biased to an open position, a track circuit for said switch including a track relay, a first and a second stick relay, a pick-up and a stick circuit for said first stick relay one of which is controlled by said first manually operable contact and by a back contact of said second stick relay and the other of which is controlled by said track relay, a pick-up and a stick circuit for said second stick relay one of which is controlled by said second manually operable contact and by a back contact of said first stick relay and the other of which is controlled by said track relay, means controlled by said first stick relay for operating said switch to a first extreme position for directing traffic movements to or from said first track, means controlled by said second stick relay for operating said switch to its other extreme position for directing traffic movements to or from said second track, a signal for governing traffic movements over said switch, and means controlled by said second stick relay for clearing said signal.

47. In combination, a traffic route including a plurality of railway switches each having a normal and a reverse position, a signal to govern traffic over the route, a remote controlled switch controlling relay for each position of each switch of the route to establish the respective normal or reverse position of the switch, a remote controlled signal controlling relay to govern the operation of said signal, a switch controlled relay for each switch having a normal and a reverse position arranged to repeat the normal and reverse position of its switch, a circuit closed only when each switch controlled relay of the route agrees as to position with its switch controlling relay for the route, and means controlled by said circuit to render said signal controlling relay effective to clear the signal only when said circuit is closed.

48. In combination, a traffic route including a plurality of railway switches, a signal at each end of the route to govern traffic in opposite directions through the route, remote controlled switch controlling means for each switch to govern the operation of the switch, a remote controlled signal controlling relay for each signal to govern the operation of the signal, a circuit controlled by the switch controlling means of each switch of the route and arranged to be closed only if each switch of the route agrees as to position with its remote controlled switch controlling means, and a relay for each signal controlled by said circuit adapted to render the remote controlled signal controlling relay associated with the same signal ineffective to clear the signal unless said circuit is closed.

49. In combination, a system of traffic tracks adapted to be arranged into a plurality of different traffic routes each including a plurality of track switches, a signal for each route, a remote controlled means for each switch to govern the position of the switch, a remote controlled signal controlling relay to govern the operation of the signal, a circuit for each route completed upon the establishing of the route for energizing a check locking relay when each switch of the route occupies the position corresponding to that of its remote controlled means, and means rendered effective by the check locking relay when energized to permit the signal controlling relay for the signal associated with the route established to function to clear the signal.

50. In combination, a system of traffic tracks adapted to be arranged into a plurality of different traffic routes each including a plurality of track switches each having a normal and a reverse position, a signal for each route, a remote controlled switch controlling relay for each position of each switch to establish the corresponding position of the switch, a remote controlled signal controlling relay to govern the operation of the signal, a switch controlled relay for each switch having a normal and a reverse position corresponding to the normal and reverse positions of its switch, a circuit for each route completed when the switch controlled relay and the switch controlling relays for each switch of the route occupy the same corresponding position, a check locking relay for each route energized when the said circuit for the route is completed, and means controlled by said check locking relay when energized to render the signal controlling relay effective to clear the signal for the route.

51. In combination, a system of traffic tracks adapted to be arranged into a plurality of different traffic routes each including a plurality of track switches having a normal and a reverse position, a signal for each route, a remote controlled switch controlling relay for each position of each switch to establish the corresponding position of the switch, a remote controlled signal controlling relay for each signal to govern the operation of the signal, a switch controlled relay for each switch having a normal and a reverse position corresponding to the normal and reverse positions of its switch, a circuit for each route controlled by the switch controlling relays and the switch controlled relay of each switch of the route and completed only when there is agreement as to position between the said relays associated with each switch of the route, a check locking relay for each circuit energized when the circuit is completed, and means controlled by the check locking relay of a circuit to render when energized the signal controlling relay associated with the same route as the circuit effective to clear the signal for that route.

52. In combination, a traffic route including a plurality of railway switches, a signal at each end of the route to govern the movement of traffic in opposite directions through the route, remote controlled means for each switch of the route to govern the operation of the switch, a remote controlled signal control relay for each signal to govern the operation of the signal, a route relay for each signal control relay having a circuit closed only when each switch of the route agrees as to position with its remote controlled means, and means controlled by each signal control relay and by the associated route relay for clearing the corresponding signal.

53. In combination, a system of railway tracks adapted to be arranged to form a plurality of different traffic routes each including a plurality of track switches, a signal at each end of each route for governing the movement of traffic through the route, remote controlled means for each switch to establish the position of the switch, a remote controlled signal control relay for each signal to govern the operation of the signal, a route relay for each end of each route, a circuit for each route relay closed when the signal control relay at one end of the corresponding route is energized and each switch of the route occupies a position corresponding to that of its remote control means, provided the signal control relay at the opposite end of the same route is deenergized, and means controlled by each signal control relay and the associated route relay when energized for clearing the corresponding signal.

54. In combination, a system of traffic tracks adapted to be arranged into a plurality of different traffic routes each including a plurality of track switches having a normal and a reverse position, a signal at each end of each route to govern traffic in opposite directions through the route, remote controlled means for each switch to establish the position of the switch, a remote controlled signal controlling relay for each signal to govern the operation of the signal, a switch controlled relay for each switch having a normal and a reverse position corresponding to the normal and reverse positions of its switch, two route relays for each route including one for each end of the route, a circuit for each route relay closed only when there is agreement as to position between the remote controlled means and the switch controlled relay for each switch of the corresponding route, and a circuit for clearing each signal controlled by the signal control relay and by the route relay at its end of the route.

55. In combination, a plurality of partly interinclusive groups of energy-responsive devices, a manually operable device for each of said groups, a second manually operable device for each of said groups, a stick relay for each group, a pick-up circuit for each stick relay, controlled by the first manually operable device of its group, a plurality of circuits each including a portion of said pick-up circuit for energizing the energy-responsive devices in its group successively, and a stick circuit for each stick relay controlled by the second manually operable device of its group for continuing the energization of the energy-responsive devices of its group.

56. In a centralized traffic control system for railroads, a control office, a field station, a communication system interconnecting said control office and said field station, a track switch at said field station, a switch machine for operating said track switch, a switch control lever in said control office for governing operation of said switch machine through the medium of said communication system, indication means for indicating the correspondence between said switch control lever and said track switch, signals governing traffic over said track switch, signal control means in the control office for governing said signals through the medium of said communication system, means preventing said signal control means from governing said signals when said track switch and said switch control lever are out of correspondence as indicated by said indication means, and means preventing said switch control lever from governing said track switch when said signal control means is effective to govern said signals.

57. In a centralized traffic control system for railroads, a control office, a field station, a communication system interconnecting said control office and said field station, a track switch at said field station, a switch machine for operating said track switch, a switch control lever in said control office for governing operation of said switch machine through the medium of said communication system, track switch position indicating means in the control office governed through the medium of said communication system, indication means in the control office for indicating the correspondence between said switch control lever and said track switch position indicating means, signals governing traffic over said track switch, signal control means in the control office for governing said signals through the medium of said communication system, and means preventing said signal control means from governing said signals when said track switch and said switch control lever are out of correspondence as indicated by said indication means.

58. In a centralized traffic control system for railroads; a field station comprising a track switch, a signal for governing traffic over said track switch, a switch control relay, a signal control relay; a control office comprising a switch control lever, a signal control lever and a switch indication repeating relay; a communication system interconnecting said field station and said control office; means causing said switch indication repeating relay to be governed in accordance with the position of said track switch through the medium of said communication system; means causing said switch control relay to be governed in accordance with said switch control lever through the medium of said communication system; means causing said signal control relay to be governed by said signal control lever only when said switch indication repeating relay indicates that said track switch is in correspondence with said switch control lever.

59. In a centralized traffic controlling system for railroads, a control office, a field station, a communication system connecting said control office and said field station, a track switch at said field station, a switch machine for operating said track switch, a signal governing traffic over said track switch, a switch control lever in the control office for governing said track switch at the field station through the medium of said communication system, a signal control lever in the control office for governing said signal at the field station through the medium of said communication system, track switch position indicating means governed in accordance with the position of said track switch, means causing said switch machine to respond to said switch control lever only when said signal lever is in a stop position, means causing said signal to respond to said signal control lever only when said track switch position indicating means is in correspondence with said switch control lever.

60. In an interlocking system for railroads, a track layout having a plurality of tracks interconnected by a plurality of track switches to form a plurality of different routes, a plurality of signals for governing traffic through said track layout, a miniature track diagram corresponding to said track layout, a route button on said track diagram for each of said signals and in corresponding positions, contacts operated by each of said route buttons, a route circuit for each of said routes through said track layout, a route relay included in each of said route circuits, switch operating means controlled by each route relay for operating each of said track switches included in its route to a position proper for establishing such route, manually operable means for each track switch for governing said switch operating means for that switch independently of said route relays, signal control means controlled by each of said route relays for clearing the one of said signals governing traffic over such route, and means requiring said switches for a route to respond to their respective switch operating means before said signal control means for that route can be effective.

61. In combination, a section of railway track including a track switch, power operating means for the track switch, manually controlled means for governing the operation of said power operating means, indication means for indicating the position of said track switch and its correspondence with said manually controlled means, a route circuit for each route through said section including contacts of said indication means, a signal relay located near each end of each route circuit and energized when said circuit is energized, a second relay associated with each signal relay, contacts on each of said second relays for energizing its route circuit from its particular end, means preventing the control of said energized route circuit by said second relay at the opposite end while such route circuit is energized, and means preventing operation of said manually controlled means when any route circuit is energized.

62. In combination, a stretch of railway track including a track switch, a signal at each end of said stretch for governing the movement of traffic into said stretch from that end, power operated means for operating said track switch, switch control means for controlling said power operated means, a circuit portion closed only when said switch control means and said power operated means assumes corresponding positions, a traffic governing relay for each of said signals which must be energized to permit clearing of such signal, a route circuit between said traffic governing relays and including said circuit portion, one terminal of a current source connected at each end of said route circuit for supplying potential of one polarity to said circuit, manually controlled means for disconnecting one of said terminals and connecting another terminal of said source to said circuit to energize one of said route relays whereby a plurality of route circuits include the same contacts, and a particular route circuit cannot be closed unless said switch control means and said power operated means assume corresponding positions.

63. In combination, a stretch of multiple railway track including a plurality of track switches, a signal at each starting point of track routes over said track for governing the movement of traffic into such route from that end, separate power operated means for operating each track switch, switch control means for controlling each power operated means, a circuit portion for each switch closed only when the switch control means and its associated power operated means assumes corresponding positions, a traffic governing relay for each of said signals which must be energized to permit clearing of such signal, a route circuit between said traffic governing relays and including a circuit portion for each switch in such route, one terminal of a current source at each end of said route circuit for supplying current to said circuit but normally ineffective, manually controlled means for disconnecting one of said terminals and connecting the other terminal of said source to said circuit, whereby said route circuit cannot be closed unless each switch control means and its power operated means assume corresponding positions.

64. In combination, a stretch of railway track including a track switch, a signal at each end of said stretch for governing the movement of traffic into said stretch from that end, power operated means for operating said track switch, manually governable switch control means for controlling said power operated means to thereby operate said track switch to normal and reverse positions, a circuit portion closed only when said switch control means and said power operated means assume corresponding positions, a route circuit extending from one to the other of said signals and including said circuit portion, one terminal of a source of current connected to each end of said route circuit for supplying current to said route circuit to clear one only of said signals at one time, manually controlled means independent of said manually governable switch control means for disconnecting said terminal and connecting the other terminal of said source to said circuit to energize said circuit, whereby a plurality of route circuits include the same contacts and a particular route circuit cannot be closed unless said switch control means and said power operated means assumes corresponding positions.

65. In an interlocking system, a track layout including a track switch, signals for governing traffic in both directions over said track switch in both of its positions, a switch machine for operating said track switch, a switch control relay for controlling the operation of said switch machine, a switch control lever for governing said control relay, locking means for preventing control of said switch control relay by said lever when any of said signals are cleared and for permitting control of said switch control relay by said lever only while said signals are at stop, three route circuit portions each corresponding to a track portion isolatable by said track switch, contact means operated in accordance with the correspondence between said track switch and said switch control relay for connecting said circuit portions to establish route circuits each corresponding to the track route then established, a signal lever for each end of said route circuits for energizing an established route circuit from its end, means preventing a signal lever from either energizing or deenergizing an established route circuit which is energized from the opposite end, and means for clearing the signal corresponding to that end of a route circuit at which such route circuit is energized dependent upon said signal lever for that end and dependent upon the energization of such route circuit.

66. In a traffic controlling system for railroads, a stretch of railroad track, signals governing the entrance of traffic into said stretch in both directions, an individual control lever for each of said signals, means governed by each of said control levers for clearing its respective signal, interlocking means for allowing said signals to be cleared for only one direction at a time, timing means for said signals, means for setting said timing means into operation to measure a predetermined time whenever a signal is returned to stop from a clear condition by its control lever, and means effective through the medium of said interlocking means to prevent the clearing of each signal in response to its respective control lever until after the other signal has been put to stop by its control lever for the predetermined time measured by said timing means.

67. In an interlocking system for railroads; a track layout containing a plurality of routes each including a plurality of track switches and track sections joining said track switches; a plurality of route circuits, each corresponding to one of said routes, and each including a wire for said track section and a double throw circuit controller for each track switch; a control lever for each of said track switches; manually operable means capable, when rendered effective, of energizing an established route circuit; a signal controlled by each route circuit; and means rendering said manually operable means effective when said track switches are in positions corresponding to the positions of their respective control levers.

68. In an interlocking system for railroads, a track layout containing a plurality of routes each including a plurality of track switches and track sections joining said track switches; a plurality of route circuits, each corresponding to one of said routes, and each including a wire for said track section and a double throw circuit controller for each track switch; a control lever for each of said track switches; manually operable means capable, when rendered effective, of energizing an established route circuit, a signal controlled by each route circuit; and means initially rendering said manually operable means effective only when said track switches are in positions corresponding to the positions of their respective control levers.

69. In an interlocking system for railroads, a track layout containing a plurality of routes each containing a plurality of track switches and track sections joining said track switches; a signal for governing traffic over each of said routes; a plurality of route circuits, each including a wire for each of said track sections and a double throw circuit controller for each of said track switches for the corresponding route; a control lever for each of said track switches for governing their operation; a signal lever for each route; relay means for each route for energizing the corresponding established route circuit in response to a manual operation of the signal lever for that route; and means rendering said relay means in a particular route responsive to a lever for that route only when said track switches are in positions corresponding to the positions of their respective control levers.

70. In an interlocking system, the combination with a track layout containing a plurality of routes each including a plurality of track switches and track sections joining said track switches, signals for governing traffic movements over said routes, a plurality of route circuits each corresponding to one of said routes and each including a wire for each track section and a double throw circuit controller for each track switch, manually operable means for energizing an established route circuit, and means controlled by an established route circuit for locking all track switches included in the corresponding route and for clearing the signal for governing traffic movements over such route.

71. In an interlocking system, a track layout containing a plurality of track switches for forming a plurality of routes, manually governable power operated means for individually operating said track switches, a signal for each entrance location of said routes, said signal being capable of giving clear or stop indications, means preventing the power operation of any track switch in any one of said routes having its respective signal therefor cleared but allowing the manual act for the governing thereof to take place without affecting the indicating condition of said signal, and means causing a track switch to be operated by its power-operated means in response to such manual act, executed while the signal governing a route over it was clear, if said signal governing the route over said track switch is operated to stop.

72. In an interlocking system, a track layout containing a plurality of track switches for setting up a plurality of routes, power operating means for each track switch, individual control means for each power operating means whereby any of said routes may be set up, said control means being permitted to be operated to positions to set up a route conflicting with a route already set up over said track switches, and other means preventing the response of the power operating means for each switch in the second route which conflicts with the first route to the operation of its control means only until a train has passed over such switch of said first route.

73. In an interlocking system for railroads, a track layout having track sections interconnected by track switches to form traffic routes, manually operable route selecting means for each of said routes, control relays for said track switches, means responsive to the operation of the route selecting means for a particular route to condition a control relay for each of the track switches in that route, said means acting to condition a particular control relay dependent upon the condition of the control relay for the next adjacent track switch, and means effective to clear a route only after a control relay for each of the track switches in that route has been conditioned.

74. In an interlocking system for railroads, a track layout having track sections interconnected by track switches to form traffic routes having different entrance points and a common exit point, a signal at each entrance point for governing traffic movements over the corresponding route, a control relay for each track switch, route selecting means for each route, means responsive to the operation of the route selecting means for each of said routes to successively condition said control relays as required to establish the corresponding route, the conditioning of the control relay for each switch except the first switch of the route being dependent upon that of the control relays for each preceding switch of the route, and means governed by the switch control relays when conditioned in accordance with a particular route to operate the track switches to the positions required for such route.

75. In an interlocking system for railroads, a track layout having track sections interconnected by track switches to form traffic routes, manually operable route selecting means for each of said routes, normal and reverse control relays for each of said track switches, means responsive to the operation of the route selecting means for a particular route to actuate a normal or a reverse control relay for each track switch in that route, said means first actuating the normal or the reverse control relay for a first track switch, the actuation of the normal or the reverse control relay for each remaining track switch being dependent upon the actuated condition of the normal and the reverse control relays for preceding track switches, and means effective to clear a route in response to the actuation of the route selecting means for such route only after a normal or a reverse control relay has been actuated for every track switch in that route.

76. In an interlocking system for railroads, a track layout having track portions interconnected by track switches to form traffic routes, a signal at the entrance to each route for governing traffic movements over the route, manually controllable route control means for each route, route complete relays, route selecting contacts for each track switch, a route circuit network corresponding to said track layout having conductors for said track portions interconnected by said route selecting contacts to form route circuits, one for each of said routes, each said circuit including at the exit end the winding of a route complete relay, control relays for governing the track switches as required in response to the operation of the route control means for any route and for conditioning said route selecting contacts to complete the route circuit for the corresponding route, circuits for said control relays each including one or more of the conductors of said route circuit network, means responsive to the operation of the route control means for any route for energizing selected ones of said conductors successively to condition said control relays as required to energize the route circuit and route complete relay for the corresponding route, and means governed by said route complete relay and the operated route control means for clearing the signal for such route.

77. In an interlocking system for railroads, a track layout having a plurality of track portions interconnected by track switches to form traffic routes having a common exit and different entrances, a route button for each route entrance, a control relay for each track switch which when energized governs the operation of the track switch to one of its two positions, means effective when the route button for the entrance to a particular route is operated to energize the control relay for the first track switch of the corresponding route, means including a front contact of each control relay for such route for energizing the control relay for the next track switch of such route under the control of the operated route button, other means for energizing the control relays for each except the first track switch of said particular route in response to the operation of other route buttons, and means responsive to the energization of said control relays for rendering said other means ineffective.

78. In an interlocking system, a track layout containing a plurality of track switches for forming a plurality of routes each including one or more of such track switches, individually manually governable power operated means for individually operating said track switches, a wayside signal for each of said routes capable of giving clear or stop indications, means preventing the power operation of any track switch in any one of said routes having its respective signal therefor cleared but allowing the manual act for the governing thereof to take place and be stored irrespective of the presence of a train in such route, and means initiated by a train moving over the original prevailing route provided the signal for such route has been operated to indicate stop for causing a track switch to be operated by its power operated means in response to such manual act.

HOWARD A. THOMPSON.